United States Patent
Liang et al.

(10) Patent No.: US 12,301,108 B2
(45) Date of Patent: May 13, 2025

(54) CASCADE SWITCHED CAPACITOR CONVERTER TO REDUCE SWITCHING LOSS

(71) Applicant: Southchip Semiconductor Technology (Shanghai) Co., Ltd., Shanghai (CN)

(72) Inventors: Xing Liang, Shanghai (CN); Wei Zhao, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 253 days.

(21) Appl. No.: 17/985,039

(22) Filed: Nov. 10, 2022

(65) Prior Publication Data
US 2023/0155493 A1 May 18, 2023

(30) Foreign Application Priority Data
Nov. 12, 2021 (CN) .......................... 202111337178.1

(51) Int. Cl.
*H02M 3/07* (2006.01)
*H02M 1/00* (2007.01)

(52) U.S. Cl.
CPC ........... *H02M 3/07* (2013.01); *H02M 1/0058* (2021.05)

(58) Field of Classification Search
CPC .............................................. H02M 3/07–073
See application file for complete search history.

(56) References Cited

U.S. PATENT DOCUMENTS

| | | | | |
|---|---|---|---|---|
| 10,797,607 | B2* | 10/2020 | Rainer | H02M 3/33523 |
| 10,804,798 | B1* | 10/2020 | Rizzolatti | H02M 3/33573 |
| 11,750,093 | B1* | 9/2023 | Han | H02M 3/07 363/13 |
| 2021/0359606 | A1* | 11/2021 | Han | H02M 1/0054 |
| 2022/0263410 | A1* | 8/2022 | Saggini | H02M 3/07 |
| 2022/0337078 | A1* | 10/2022 | Shao | H02M 3/07 |
| 2023/0155478 | A1* | 5/2023 | Zhao | H02M 3/1582 363/13 |
| 2023/0155491 | A1* | 5/2023 | Liang | H02M 1/0054 363/13 |
| 2023/0155492 | A1* | 5/2023 | Zhao | H02M 1/0095 323/235 |
| 2023/0155494 | A1* | 5/2023 | Zhao | H02M 3/07 363/13 |
| 2023/0155495 | A1* | 5/2023 | Liang | H02M 3/1582 323/235 |

(Continued)

FOREIGN PATENT DOCUMENTS

| | | |
|---|---|---|
| CN | 110165892 | 8/2019 |
| CN | 110729888 | 11/2020 |
| CN | 114070041 | 2/2022 |

(Continued)

*Primary Examiner* — Sisay G Tiku

(57) ABSTRACT

A switched capacitor converter includes an auxiliary circuit, a first branch and a second branch, the auxiliary circuit is connected between the first branch and the second branch, all power transistors of the first branch and the second branch are primary power transistors, and the auxiliary circuit transfers a charge or electric charges on one of the first branch and the second branch to another of the first branch and the second branch during a dead time when the primary power transistors are turned off, so as to the primary power transistors turn on at zero voltage and reduce a switching loss.

23 Claims, 12 Drawing Sheets

(56) References Cited

U.S. PATENT DOCUMENTS

2023/0318340 A9 * 10/2023 Shao .................. H02M 3/07
                                                                                307/23
2023/0353058 A1 * 11/2023 Rizzolatti ............. H02M 3/155

FOREIGN PATENT DOCUMENTS

| CN | 115362614 A | * | 11/2022 | ............ H02J 7/0016 |
|----|-------------|---|---------|--------------------------|
| EP | 3678288 A1  | * | 7/2020  | ............ H02M 3/07   |
| EP | 4075635 A1  | * | 10/2022 | ............ H02J 7/0013 |

* cited by examiner

CASCADE SWITCHED CAPACITOR CONVERTER TO REDUCE SWITCHING LOSS

CROSS-REFERENCE TO RELATED APPLICATION

This application claims the priority benefit of Chinese application serial no. 202111337178.1, filed on Nov. 12, 2021. The entirety of the above-mentioned patent application is hereby incorporated by reference herein and made a part of this specification.

BACKGROUND

Technical Field

The present application relates to the field of switching power supply, and particularly relates to a switched capacitor converter.

Description of Related Art

Conventional inductive direct current-direct current (DC-DC) converters (such as buck, boost, buck-boost, etc.) are widely used in 5G base station, server power supply, and mobile phone motherboard to achieve the conversion between different voltages. However, a conversion efficiency of the conventional inductive converter is generally inefficient due to large switching loss and inductive loss. In some applications, such as 5G communication with high power consumption and mobile phones with high power fast charging, the inductive DC-DC converter must have the higher conversion efficiency. However, the conventional inductive converter has failed to meet efficiency requirements.

Since the energy density of capacitors is higher than that of inductors, the conversion efficiency of switched capacitor converters using capacitors for energy transmission is much higher than that of the inductive DC-DC converter, and are widely used in various high efficiency scenarios. There are different types switched capacitor converters, and cascade switched capacitor converters are widely used because of their low equivalent impedance.

As shown in FIG. 1, a conventional cascade 4:1 switched capacitor converter includes fourteen power transistors (i.e., power transistor Q1A, power transistor Q1B, power transistor Q2A, power transistor Q2B, power transistor Q3A, power transistor Q3B, power transistor Q4A, power transistor Q4B, power transistor Q5A, power transistor Q5B, power transistor Q6A, power transistor Q6B, power transistor Q7A and power transistor Q7B), four capacitors (i.e., capacitor C1A, capacitor C1B, capacitor C2A and capacitor C2B), an input capacitance CIN, an output capacitor COUT and an output load IOUT. In control, the power transistor Q1B, the power transistor Q2A, the power transistor Q3B, the power transistor Q4B, the power transistor Q5A, the power transistor Q6B and the power transistor Q7A are driven by a same control signal, and the power transistor Q1A, the power transistor Q2B, the power transistor Q3A, the power transistor Q4A, the power transistor Q5B, the power transistor Q6A and the power transistor Q7B are driven by a same control signal. The both control signals are square wave signals with 50% duty ratio, and have a complementary in waveform. The conventional cascade 4:1 switched capacitor converter can realize that the output voltage VOUT is ¼ of the input voltage, i.e. VIN=4*VOUT. And the voltages on the four capacitors are VC1A=VOUT, VC1B=VOUT, VC2A=2*VOUT, VC2B=2*VOUT, respectively.

Although the conventional 4:1 cascade switched capacitor converter has no switching-off loss and inductive loss, it still needs to overcome the switching loss of two parasitic capacitors Cds and Cgd when the power transistors are turned on. For high voltage and low current applications, a ratio of switching loss is larger due to the higher voltage differences on the two parasitic capacitors Cds and Cgd, which limits the further improvement of converter efficiency of the conventional 4:1 cascade switched capacitor converter.

SUMMARY

The present application is directed to the above-mentioned problems, and a switched capacitor converter is proposed, the zero voltage switching (ZVS) function of all primary power transistors can be realized by adding an auxiliary circuit, thereby reducing switching loss. At the same time, the topology architecture of the switched capacitor converter can be extended to a $2^N:1$ switched capacitor converter.

An aspect of the present application provides a switched capacitor converter, comprising an auxiliary circuit, a first branch and a second branch, the auxiliary circuit is connected between the first branch and the second branch, all power transistors of the first branch and the second branch are primary power transistors, and the auxiliary circuit is configured to transfer a charge or electric charges on one of the first branch and the second branch to another of the first branch and the second branch during a dead time when the primary power transistors are turned off, so that voltage difference of both terminals of each of the primary power transistors becomes zero, and the primary power transistors are turned on under zero voltage respectively.

In some embodiments of the present application, the switched capacitor converter is a 4:1 switched capacitor converter, the first branch comprises a first power transistor, a second power transistor, a third power transistor, a fourth power transistor, a fifth power transistor, a sixth power transistor, a seventh power transistor, a first capacitor and a second capacitor, and the second branch includes an eighth power transistor, a ninth power transistor, a tenth power transistor, an eleventh power transistor, a twelfth power transistor, a thirteenth power transistor, a fourteenth power transistor, a third capacitor and a fourth capacitor.

A first terminal of the seventh power transistor and a first terminal of the fourteenth power transistor are connected as an input terminal of the switched capacitor converter, the input terminal is connected to an external input voltage, a second terminal of the seventh power transistor is connected to a first terminal of the sixth power transistor and a first terminal of the second capacitor respectively, and a second terminal of the fourteenth power transistor is connected to a first terminal of the thirteenth power transistor and a first terminal of the fourth capacitor respectively.

A second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively.

A second terminal of the fifth power transistor is connected to a first terminal of the fourth power transistor and a second terminal of the second capacitor, a second terminal of the twelfth power transistor is connected to a first terminal of the eleventh power transistor and a second terminal of the fourth capacitor respectively, and a second terminal of the fourth power transistor and a second terminal of the eleventh power transistor are grounded.

A second terminal of the third power transistor is connected to a first terminal of the second power transistor, a second terminal of the second power transistor is connected to a first terminal of the first power transistor and a second terminal of the first capacitor respectively, and a second terminal of the first power transistor is grounded.

A second terminal of the tenth power transistor is connected to a first terminal of the ninth power transistor, a second terminal of the ninth power transistor is connected to a first terminal of the eighth power transistor and a second terminal of the third capacitor respectively, and a second terminal of the eighth power transistor is grounded.

The second terminal of the third power transistor, the first terminal of the second power transistor, the first terminal of the ninth power transistor and the second terminal of the tenth power transistor are connected as an output terminal of the switched capacitor converter.

The second terminal of the second capacitor, the second terminal of the fifth power transistor and the first terminal of the fourth power transistor are connected as a second node, and the second terminal of the fourth capacitor, the second terminal of the twelfth power transistor and the first terminal of the eleventh power transistor are connected as a fourth node.

Both terminals of the auxiliary circuit are connected to the second node and the fourth node respectively.

In some embodiments of the present application, the auxiliary circuit comprises a fifteenth power transistor, a sixteenth power transistor, a seventeenth power transistor, an eighteenth power transistor and an inductor; a first terminal of the fifteenth power transistor is connected to the second node, a second terminal of the fifteenth power transistor is connected to a first terminal of the inductor and a first terminal of the sixteenth power transistor respectively, and a second terminal of the sixteenth power transistor is grounded; and a second terminal of the inductor is connected to a first terminal of the seventeenth power transistor and a first terminal of the eighteenth power transistor respectively, a second terminal of the seventeenth power transistor is grounded, and a second terminal of the eighteenth power transistor is connected to the fourth node.

In some embodiments of the present application, a working sequence of the switched capacitor converter comprises six stages as follows.

A first stage: the second power transistor, the fifth power transistor, the seventh power transistor, the eighth power transistor, the tenth power transistor, the eleventh power transistor, the thirteenth power transistor, the sixteenth power transistor and the eighteenth power transistor are turned on, and remaining power transistors are turned off; the first capacitor and the second capacitor are in a charging state, the third capacitor and the fourth capacitor are in a discharging state, and a current on the inductor is 0.

A second stage: the fifth power transistor, the fifteenth power transistor and the eighteenth power transistor are turned on, and remaining power transistors are turned off; the current on the inductor increases, and the second stage ends when the current on the inductor increases to a maximum value.

A third stage: the fifteenth power transistor and the eighteenth power transistor are turned on, and remaining power transistors are turned off; the current on the inductor decreases, and the third stage ends when the current on the inductor decreases to 0.

A fourth stage: the first power transistor, the third power transistor, the fourth power transistor, the sixth power transistor, the ninth power transistor, the twelfth power transistor, the fourteenth power transistor, the fifteenth power transistor and the seventeenth power transistor are turned on, and remaining power transistors are turned off; the first capacitor and the fourth capacitor are in the discharging state, and the second capacitor and the third capacitor are in the charging state; and the current on the inductor is 0.

A fifth stage: the twelfth power transistor, the fifteenth power transistor and the eighteenth power transistor are turned on, and remaining power transistors are turned off; and the current on the inductor increases, and the fifth stage ends when the current on the inductor increases to the maximum value.

A sixth stage: the fifteenth power transistor and the eighteenth power transistor are turned on, and remaining power transistors are turned off; and the current on the inductor decreases, and the sixth stage ends when the current on the inductor decreases to 0, and returning to the first stage.

In some embodiments of the present application, the switched capacitor converter is a 8:1 switched capacitor converter, the first branch comprises a first power transistor, a second power transistor, a third power transistor, a fourth power transistor, a fifth power transistor, a sixth power transistor, a seventh power transistor, a first sub power transistor, a third sub power transistor, a fifth sub power transistor, a first capacitor, a second capacitor and a first sub capacitor.

The second branch includes an eighth power transistor, a ninth power transistor, a tenth power transistor, an eleventh power transistor, a twelfth power transistor, a thirteenth power transistor, a fourteenth power transistor, a second sub power transistor, a fourth sub power transistor, a sixth sub power transistor, a third capacitor, a fourth capacitor and a second sub capacitor.

A first terminal of the fifth sub power transistor and a first terminal of the sixth sub power transistor are connected as an input terminal of the switched capacitor converter, the input terminal of the switched capacitor converter is connected to an external input voltage, a second terminal of the fifth sub power transistor is connected to a first terminal of the first sub capacitor and a first terminal of the third sub power transistor respectively, and a second terminal of the sixth sub power transistor is connected to a first terminal of the second sub capacitor and a first terminal of the fourth sub power transistor respectively.

A second terminal of the third sub power transistor is connected to a first terminal of the thirteenth power transistor, a first terminal of the fourth capacitor and a first terminal of the second sub power transistor respectively, and a second terminal of the fourth sub power transistor is connected to a first terminal of the sixth power transistor, a first terminal of the second capacitor and a first terminal of the first sub power transistor respectively.

A second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively.

A second terminal of the third power transistor is connected to a first terminal of the second power transistor, a second terminal of the second power transistor is connected to a second terminal of the first capacitor and a first terminal of the first power transistor respectively, and a second terminal of the first power transistor is grounded.

A second terminal of the fifth power transistor is connected to a second terminal of the second capacitor and a first terminal of the fourth power transistor respectively, and a second terminal of the fourth power transistor is grounded.

A second terminal of the first sub power transistor is connected to a second terminal of the first sub capacitor and a first terminal of the seventh power transistor, and a second terminal of the seventh power transistor is grounded.

A second terminal of the tenth power transistor is connected to a first terminal of the ninth power transistor, a second terminal of the ninth power transistor is connected to a second terminal of the third capacitor and a first terminal of the eighth power transistor respectively, and a second terminal of the eighth power transistor is grounded.

A second terminal of the twelfth power transistor is connected a second terminal of the fourth capacitor and a first terminal of the eleventh power transistor, and a second terminal of the eleventh power transistor is grounded.

A second terminal of the second sub power transistor is connected to a second terminal of the second sub capacitor and a first terminal of the fourteenth power transistor, and a second terminal of the fourteenth power transistor is grounded.

The second terminal of the third power transistor, the first terminal of the second power transistor, the second terminal of the tenth power transistor and the second terminal of the ninth power transistor are connected to the output terminal of the switched capacitor converter.

The second terminal of the first sub capacitor, the second terminal of the first sub power transistor and the first terminal of the seventh power transistor are connected as a first sub node, and the second terminal of the second sub capacitor, the second terminal of the second sub power transistor and the first terminal of the fourteenth power transistor are connected as a second sub node.

Both terminals of the auxiliary circuit are connected to the first sub node and the second sub node respectively.

In some embodiments of the present application, N is an integer greater than or equal to 4, the switched capacitor converter is a $2^N$:1 switched capacitor converter, the first branch includes a first power transistor, a second power transistor, a third power transistor, a first capacitor, N−1 first basic units and a first inputting power transistor, and the second branch includes an eighth power transistor, a ninth power transistor, a tenth power transistor, a third capacitor, N−1 second basic units and a second inputting power transistor.

A first terminal of the first power transistor is connected to a second terminal of the second power transistor and a second terminal of the first capacitor respectively, a second terminal of the first power transistor is grounded, a first terminal of the first capacitor and a first terminal of the third power transistor are connected to a first connection node, and a first terminal of the second power transistor and a second terminal of the third power transistor are connected to an output terminal of the switched capacitor converter.

A first terminal of the eighth power transistor is connected to a second terminal of the ninth power transistor and a second terminal of the third capacitor respectively, a second terminal of the eighth power transistor is grounded, a first terminal of the third capacitor and a first terminal of the tenth power transistor are connected to a second connection node, and a first terminal of the ninth power transistor and a second terminal of the tenth power transistor are connected to the output terminal of the switched capacitor converter.

A first terminal of the first inputting power transistor and a first terminal of the second inputting power transistor are connected to an input terminal of the switched capacitor converter, a second terminal of the first inputting power transistor is connected to the first connection node and the second connection node respectively through the N−1 first basic units in turn according to a sequence from a level N−1-th first basic unit to a level 1-th first basic unit, and a second terminal of the second inputting power transistor is connected to the first connection node and the second connection node respectively through the N−1 second basic units in turn according to a sequence from a level N−1-th second basic unit to a level 1-th second basic unit.

The second terminal of the first inputting power transistor is connected to the level N−1-th first basic unit, and the level 1-th first basic unit is connected to the first connection node and the second connection node respectively; and the second terminal of the second inputting power transistor is connected to the level N−1-th second basic unit, and the level 1-th second basic unit is connected to the first connection node and the second connection node respectively.

In some embodiments of the present application, each of the N−1 first basic units has a first terminal, a second terminal and a third terminal, and each of the N−1 second basic units has a first terminal, a second terminal and a third terminal.

The second terminal of the first inputting power transistor is connected to a first terminal of the level N−1-th first basic unit, and the second terminal of the second inputting power transistor is connected to a first terminal of the level N−1-th second basic unit.

The first connection node is connected to a third terminal of the level 1-th first basic unit and a second terminal of the level 1-th second basic unit respectively, and the second connection node is connected to a third terminal of the level 1-th second basic unit and a second terminal of the level 1-th first basic unit respectively.

In the first branch, except for the first terminal of the level N−1-th first basic unit and the second terminal and the third terminal of the level 1-th first basic unit, a first terminal of a current level first basic unit is connected to a third terminal of a previous level first basic unit and a second terminal of a previous level second basic unit respectively, the current level first basic unit is one of the level 1-th first basic unit to the level N−1-th first basic unit, a second terminal of the current level first basic unit is connected to a first terminal of a next level second basic unit, and a third terminal of the current level first basic unit is connected to a first terminal of a next level first basic unit.

In the second branch, except for the first terminal of the level N−1-th second basic unit and the second terminal and the third terminal of the level 1-th second basic unit, a first terminal of a current level second basic unit is connected to a third terminal of the previous level second basic unit and of a second terminal of the previous level first basic unit respectively, the current level second basic unit is one of the level 1-th second basic unit to the level N−1-th second basic unit, a second terminal of the current level second basic unit is connected to the first terminal of the next level first basic unit, and a third terminal of the current level second basic unit is connected to the first terminal of the next level second basic unit.

In some embodiments of the present application, each first basic unit includes a first unit power transistor, a second unit power transistor, a third unit power transistor and a first unit capacitor, a first terminal of the first unit capacitor and a first terminal of the third unit power transistor are connected as a first terminal of the each first basic unit, a second terminal of the third unit power transistor is a second terminal of the each first basic unit, a second terminal of the first unit capacitor is connected to a first terminal of the first unit power transistor and a second terminal of the second unit power transistor respectively, a first terminal of the second unit power transistor is a third terminal of the each first basic unit, and a second terminal of the first unit power transistor is grounded.

Each second basic unit includes a fourth unit power transistor, a fifth unit power transistor, a sixth unit power transistor and a second unit capacitor, a first terminal of the second unit capacitor and a first terminal of the sixth unit power transistor are connected as a first terminal of the each second basic unit, a second terminal of the sixth unit power transistor is a second terminal of the each second basic unit, a second terminal of the second unit capacitor is connected to a first terminal of the fourth unit power transistor and a second terminal of the fifth unit power transistor respectively, a first terminal of the fifth unit power transistor is a third terminal of the each second basic unit, and a second terminal of the fourth unit power transistor is grounded.

Both terminals of the auxiliary circuit are connected to a connection node which is connected to the first unit power transistor and the second unit power transistor of the level N–1-th first basic unit and a connection node which is connected to the fourth unit power transistor and the fifth unit power transistor of the level N–1-th second basic unit respectively.

In some embodiments of the present application, the auxiliary circuit comprises a fifteenth power transistor, a sixteenth power transistor, a seventeenth power transistor, an eighteenth power transistor and an inductor; a first terminal of the fifteenth power transistor is connected to the first branch, a second terminal of the fifteenth power transistor is connected to a first terminal of the inductor and a first terminal of the sixteenth power transistor respectively, and a second terminal of the sixteenth power transistor is grounded; and a second terminal of the inductor is connected to a first terminal of the seventeenth power transistor and a first terminal of the eighteenth power transistor respectively, a second terminal of the seventeenth power transistor is grounded, and a second terminal of the eighteenth power transistor is connected to the second branch.

In some embodiments of the present application, the fifteenth power transistor, the sixteenth power transistor, the seventeenth power transistor and the eighteenth power transistor are N-type power transistors; or the sixteenth power transistor and the eighteenth power transistor are P-type power transistors, and the sixteenth power transistor and the seventeenth power transistor are N-type power transistors.

In some embodiments of the present application, the auxiliary circuit comprises a fifteenth power transistor, a sixteenth power transistor, a first diode, a second diode and an inductor; a first terminal of the fifteenth power transistor is connected to the first branch, a second terminal of the fifteenth power transistor is connected to a first terminal of the first diode and a first terminal of the inductor, a second terminal of the first diode is grounded; a second terminal of the inductor is connected to a first terminal of the second diode and a first terminal of the sixteenth power transistor, a second terminal of the second diode is grounded, and a second terminal of the sixteenth power transistor is connected to the second branch.

In some embodiments of the present application, the auxiliary circuit includes a fifteenth power transistor, a sixteenth power transistor and an inductor, a first terminal of the fifteenth power transistor is connected to the first branch, a second terminal of the fifteenth power transistor is connected to a first terminal of the inductor, a second terminal of the inductor is connected to a first terminal of the sixteenth power transistor, and a second terminal of the sixteenth power transistor is connected to the second branch.

In some embodiments of the present application, the fifteenth power transistor and the sixteenth power transistor are N-type power transistors or P-type power transistors.

The above-mentioned solution is a control sequence, and there are, of course, other control sequences on the basis of the above-mentioned circuit structure.

Therefore, an auxiliary circuit are added between two nodes of two branches respectively of a conventional switched capacitor converter, the auxiliary circuit transfers electric charges at one branch to another branch during a dead time when all the primary power transistors are turned off, so as to realize the zero voltage switching function on of all the primary power transistors and reduce the switching loss. The on-resistance of the added auxiliary power transistor is much larger than the on-resistance of the primary power transistor, and the inductance value of the auxiliary inductor is small and the package size and cost are also very low. Therefore, by adding the auxiliary circuit, the switched capacitor converter of embodiments of the present application can significantly reduce the switching loss of a switched capacitor converter, improve efficiency, and has good performance benefits and commercial prospects.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Hereinafter, the present application will be described in detail with reference to the drawings.

Figure 1:
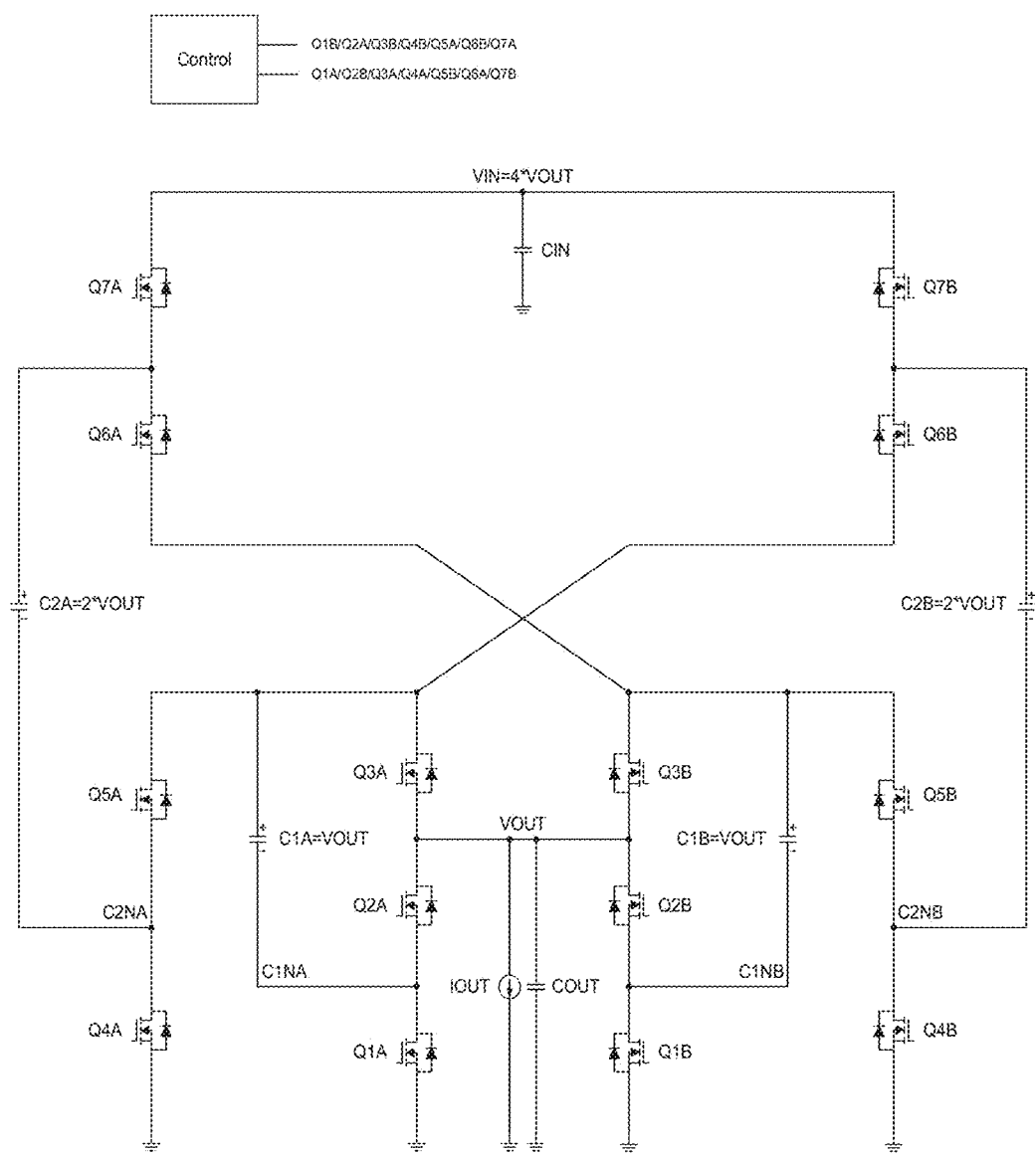
FIG. 1 is a schematic diagram showing a circuit structure of a conventional cascade 4:1 switched capacitor converter.
Figure 2:
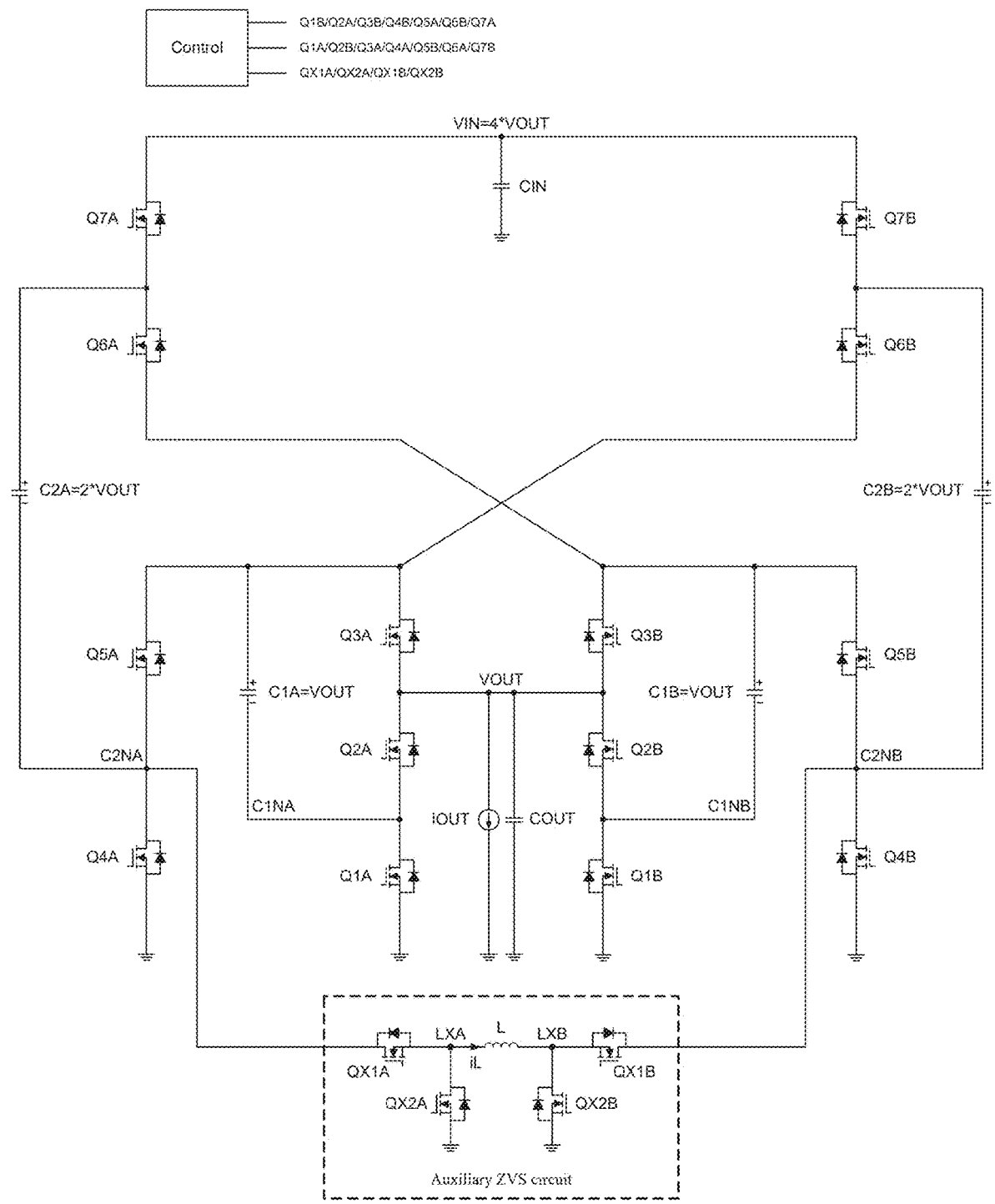
FIG. 2 is a schematic diagram showing a circuit structure of a cascade 4:1 switched capacitor converter of an embodiment of the present application.

As shown in FIG. 2, a 4:1 switched capacitor converter of an embodiment of the present application includes a primary power circuit and an auxiliary circuit. The primary power circuit includes fourteen primary power transistors (i.e., a first power transistor Q1A, an eighth power transistor Q1B, a second power transistor Q2A, a ninth power transistor Q2B, a third power transistor Q3A, a tenth power transistor Q3B, a fourth power transistor Q4A, an eleventh power transistor Q4B, a fifth power transistor Q5A, a twelfth power transistor Q5B, a sixth power transistor Q6A, a thirteenth power transistor Q6B, a seventh power transistor Q7A and a fourteenth power transistor Q7B), four capacitors (i.e., a first capacitor C1A, a third capacitor C1B, a second capacitor C2A and a fourth capacitor C2B), an input capacitor CIN, an output capacitor COUT and an output load IOUT. The auxiliary circuit includes four auxiliary power transistors (i.e., a fifteenth power transistor QX1A, a sixteenth power transistor QX2A, an eighteenth power transistor QX1B and a seventeenth power transistor QX2B), and an auxiliary inductor L.

Each of the primary power transistors has a parasitic capacitor.

The primary power circuit includes a first branch and a second branch, the first branch comprises the first power transistor Q1A, the second power transistor Q2A, the third power transistor Q3A, the fourth power transistor Q4A, the fifth power transistor Q5A, the sixth power transistor Q6A, the seventh power transistor Q7A, the first capacitor C1A and the second capacitor C2A, and the second branch includes the eighth power transistor Q1B, the ninth power transistor Q2B, the tenth power transistor Q3B, the eleventh power transistor Q4B, the twelfth power transistor Q5B, the thirteenth power transistor Q6B, the fourteenth power transistor Q7B, the third capacitor C1B and the fourth capacitor C2B.

A first terminal of the seventh power transistor Q7A and a first terminal of the fourteenth power transistor Q7B are connected to an input terminal of the switched capacitor converter, the input terminal is connected to an external input voltage, a second terminal of the seventh power transistor Q7A is connected to a first terminal of the sixth power transistor Q6A and a first terminal of the second capacitor C2A respectively, and a second terminal of the fourteenth power transistor Q7B is connected to a first terminal of the thirteenth power transistor Q6B and a first terminal of the fourth capacitor C2B respectively.

A second terminal of the sixth power transistor Q6A is connected to a first terminal of the tenth power transistor Q3B, a first terminal of the third capacitor C1B and a first terminal of the twelfth power transistor Q5B respectively, and a second terminal of the thirteenth power transistor Q6B is connected to a first terminal of the third power transistor Q3A, a first terminal of the first capacitor C1A and a first terminal of the fifth power transistor Q5A respectively.

A second terminal of the fifth power transistor Q5A is connected to a first terminal of the fourth power transistor Q4A and a second terminal of the second capacitor C2A, a second terminal of the twelfth power transistor Q5B is connected to a first terminal of the eleventh power transistor Q4B and a second terminal of the fourth capacitor C2B respectively, and a second terminal of the fourth power transistor Q4A and a second terminal of the eleventh power transistor Q4B are grounded.

A second terminal of the third power transistor Q3A is connected to a first terminal of the second power transistor Q2A, a second terminal of the second power transistor Q2A is connected to a first terminal of the first power transistor Q1A and a second terminal of the first capacitor C1A respectively, and a second terminal of the first power transistor Q1A is grounded.

A second terminal of the tenth power transistor Q3B is connected to a first terminal of the ninth power transistor Q2B, a second terminal of the ninth power transistor Q2B is connected to a first terminal of the eighth power transistor Q1B and a second terminal of the third capacitor C1B respectively, and a second terminal of the eighth power transistor Q1B is grounded.

The second terminal of the third power transistor Q3A, the first terminal of the second power transistor Q2A, the first terminal of the ninth power transistor Q2B and the second terminal of the tenth power transistor Q3B are connected to an output terminal of the switched capacitor converter.

The second terminal of the second capacitor C2A, the second terminal of the fifth power transistor Q5A and the first terminal of the fourth power transistor Q4A is connected to a second node C2NA, and the second terminal of the fourth capacitor C2B, the second terminal of the twelfth power transistor Q5B and the first terminal of the eleventh power transistor Q4B is connected to a fourth node C2NB.

Both terminals of the auxiliary circuit are connected to the second node C2NA and the fourth node C2NB respectively. For example, the auxiliary circuit comprises a fifteenth power transistor QX1A, a sixteenth power transistor QX2A, a seventeenth power transistor QX2B, an eighteenth power transistor QX1B and an inductor L.

A first terminal of the fifteenth power transistor QX1A is connected to the second node C2NA, a second terminal of the fifteenth power transistor QX1A is connected to a first terminal of the inductor L and a first terminal of the sixteenth power transistor QX2A respectively, and a second terminal of the sixteenth power transistor QX2A is grounded.

A second terminal of the inductor L is connected to a first terminal of the seventeenth power transistor QX2B and a first terminal of the eighteenth power transistor QX1B respectively, a second terminal of the seventeenth power transistor QX2B is grounded, and a second terminal of the eighteenth power transistor QX1B is connected to the fourth node C2NB.

In steady state working conditions, VIN=4*VOUT, VC1A=VOUT, VC1B=VOUT, VC2A=2*VOUT, VC2B=2*VOUT. The VIN presents an input voltage, the VOUT presents an output voltage, the VC1A presents a voltage difference between both terminals of the first capacitor C1A, the VC1B presents a voltage difference between both terminals of the third capacitor C1B, the VC2A presents a voltage difference between both terminals of the second capacitor C2A, and the VC2B presents a voltage difference between both terminals of the fourth capacitor C2B.

Figure 3:
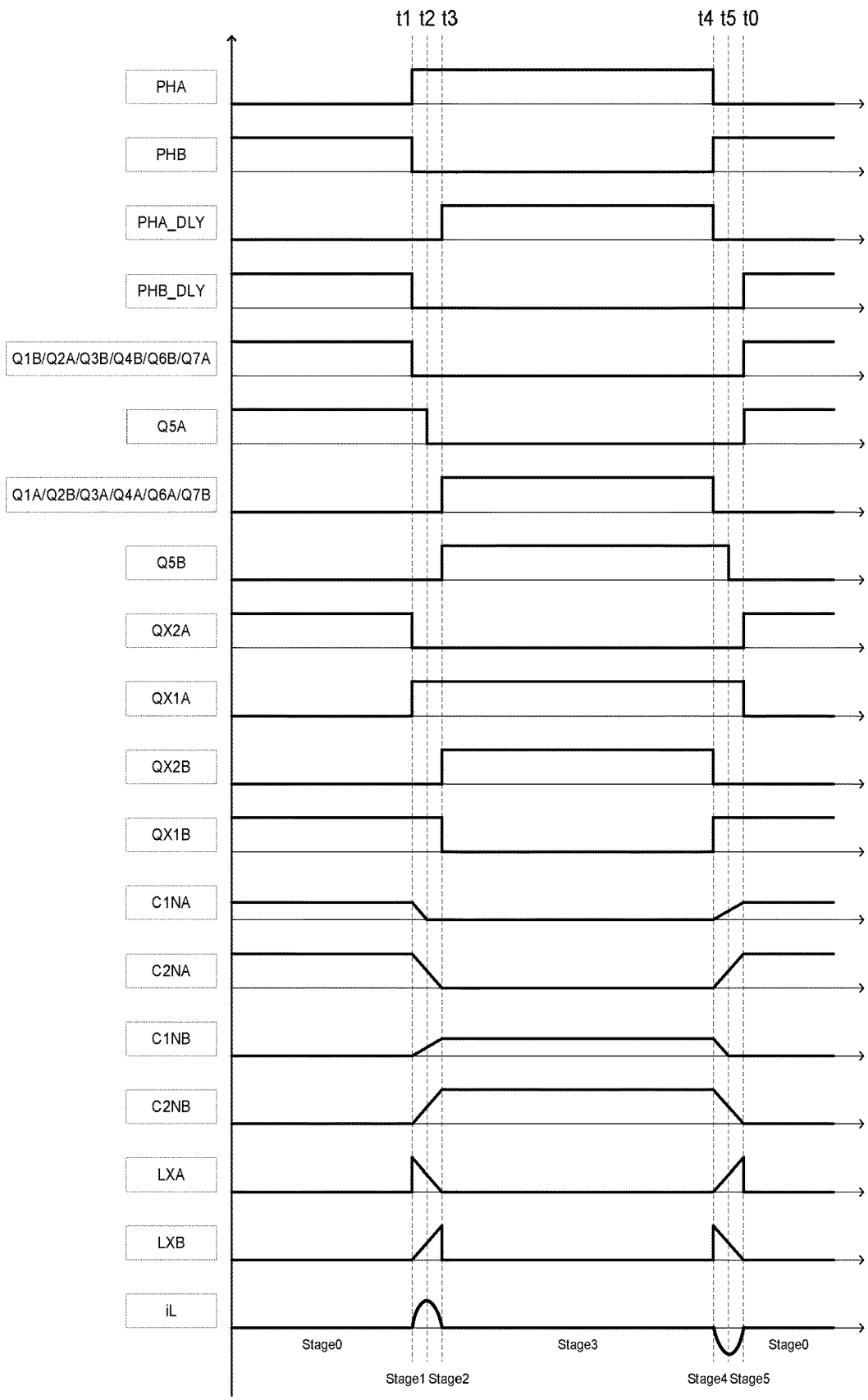
FIG. 3 is a typical waveform diagram of a 4:1 switched capacitor converter of an embodiment of the present application.

FIG. 3 shows a working waveform of a 4:1 switched capacitor converter working in one switching cycle. There are six working states in sequence within one working cycle, namely stage 0, stage 1, stage 2, stage 3, stage 4 and stage 5. A signal PHA is an original clock signal with a 50% duty ratio, a signal PHB is an inverse signal of the PHA, a signal PHA_DLY is a clock signal obtained by the PHA passing a delay, a signal PHB_DLY is a clock signal obtained by PHB passing a delay. Signals corresponding to Q1B, Q2A, Q3B, Q4B, Q6B and Q7A present on-off states of the eighth power transistor Q1B, the second power transistor Q2A, the tenth power transistor Q3B, the eleventh power transistor Q4B, the thirteenth power transistor Q6B and the seventh power transistor Q7A respectively, and signals corresponding to Q1A, Q2B, Q3A, Q4A, Q6A and Q7B present on-off states of the first power transistor Q1A, the ninth power transistor Q2B, the third power transistor Q3A, the fourth power transistor Q4A, the sixth power transistor Q6A and the fourteenth power transistor Q7B respectively. A signal corresponding to Q5A presents an on-off state of the fifth power transistor Q5A, and a signal corresponding to Q5B presents an on-off state of the twelfth power transistor Q5B. Signals corresponding to QX1A, QX2A, QX1B and QX2B present on-off states of the fifteenth power transistor QX1A, the sixteenth power transistor QX2A, the eighteenth power transistor QX1B and the seventeenth power transistor QX2B respectively. Signals corresponding to CFLA and CFLB present voltage waveforms of a first node CFLA and a second node CFLB respectively, Signals corresponding to LXA and LXB present voltage waveforms of a node LXA and a node LXB respectively, and a signal corresponding to iL presents a current waveform flowing through inductor L.

Figure 4:
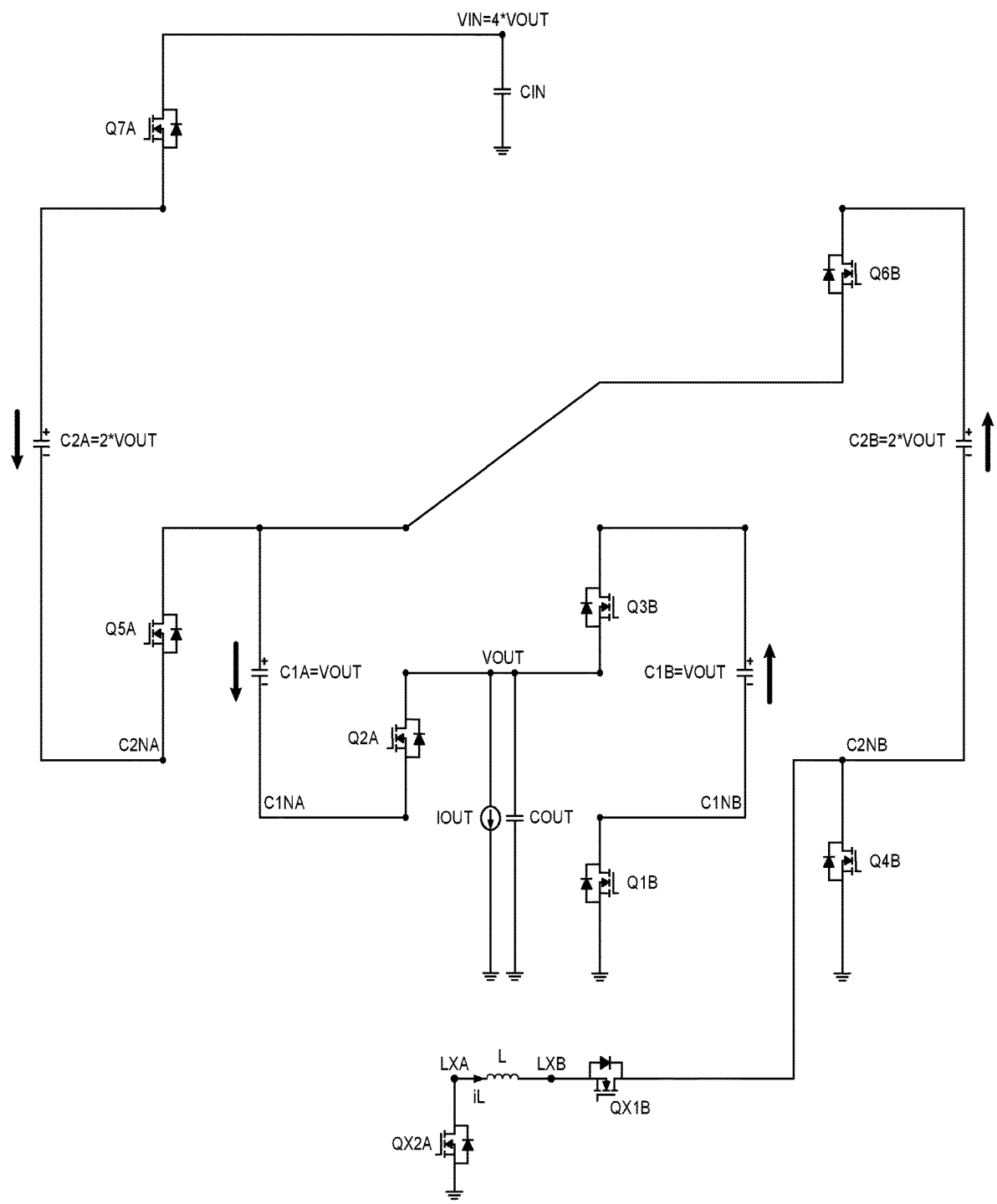
FIG. 4 is an equivalent circuit diagram of a 4:1 switched capacitor converter working in Stage 0 of an embodiment of the present application.

Stage 0 (t0-t1): As shown in FIG. 4, in the stage 0, the eighth power transistor Q1B, the second power transistor Q2A, the tenth power transistor Q3B, the eleventh power transistor Q4B, the fifth power transistor Q5A, the thirteenth power transistor Q6B and the seventh power transistor Q7A are turned on, and the first power transistor Q1A, the ninth power transistor Q2B, the third power transistor Q3A, the fourth power transistor Q4A, the twelfth power transistor Q5B, the sixth power transistor Q6A and the fourteenth power transistor Q7B are turned off. The first capacitor C1A is in charge state, the third capacitor C1B is in discharge state, the second capacitor C2A is in charge state, and the fourth capacitor C2B is in discharge state. In the auxiliary circuit part, the eighteenth power transistor QX1B and the sixteenth power transistor QX2A are turned on, and the fifteenth power transistor QX1A and the seventeenth power transistor QX2B are turned off. In this stage, a voltage of the first node C1NA is equal to the output voltage, a voltage of the second node C2NA is equal to twice the output voltage: 2*VOUT, voltages of a third node C1NB and a fourth node C2NB are zero, voltages of the node LXA and node LXB are zero, and the current flowing through the inductor L is zero.

Figure 5:
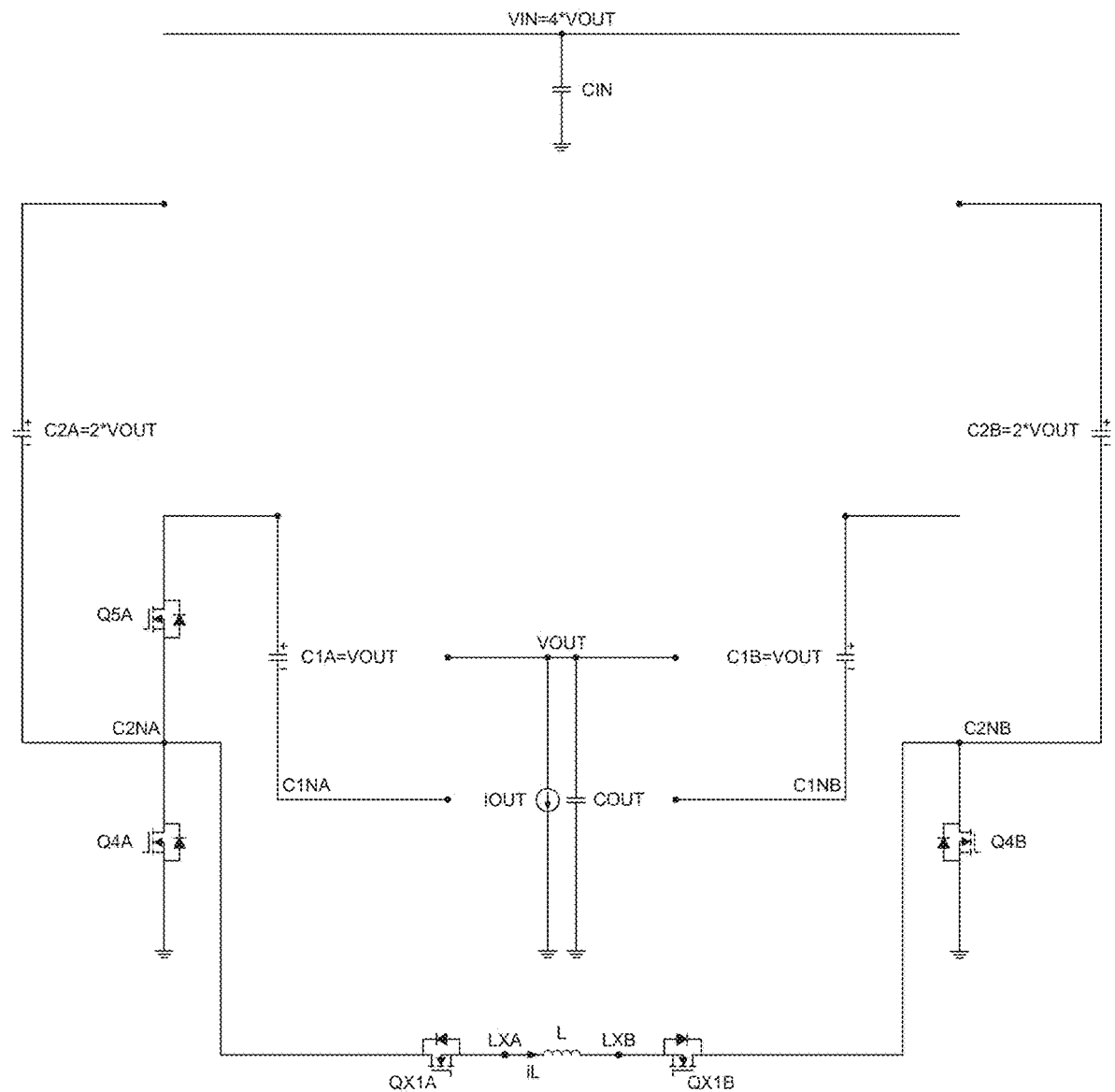
FIG. 5 is an equivalent circuit diagram of a 4:1 switched capacitor converter working in Stage 1 of an embodiment of the present application.

Stage 1 (t1-t2): As shown in FIG. 5, at the moment t1, the eighth power transistor Q1B, the second power transistor Q2A, the tenth power transistor Q3B, the eleventh power transistor Q4B, the thirteenth power transistor Q6B and the seventh power transistor Q7A are turned off, the first power transistor Q1A, the ninth power transistor Q2B, the third power transistor Q3A, the fourth power transistor Q4A, the twelfth power transistor Q5B, the sixth power transistor Q6A and the fourteenth power transistor Q7B remain turning off, therefore, all the primary power transistors are turned off except for the fifth power transistor Q5A which remains turning on. The first capacitor C1A, the third capacitor C1B, the second capacitor C2A, the fourth capacitor C2B stop charging or discharging and maintain current voltage differences respectively. A load current is provided by the output capacitor COUT which is in discharge state. The sixteenth power transistor QX2A and the seventeenth power transistor QX2B are turned off, and the fifteenth power transistor QX1A and the eighteenth power transistor QX1B are turned on.

Before the moment t1, the voltage of the first node C1NA is VOUT, the voltage of the second node C2NA is 2*VOUT, and the voltages of the third node C1NB and the fourth node C2NB are zero. From the moment t1, the inductor L is connected between the second node C2NA and the fourth node C2NB, and a parasitic capacitor of the second node C2NA, a parasitic capacitor of the fourth node C2NB and the inductor L start to resonate. The voltage of the second node C2NA syntonically decreases, and the voltage of the first node C1NA is driven to decrease by the fifth power transistor Q5A. The voltage of the fourth node C2NB syntonically increases, and the voltage of the third node C1NB is driven to increase by a body diode of the twelfth power transistor Q5B. A current of the inductor L gradually increases. When the voltage of the second node C2NA decreases to VOUT, the voltage of the second node C2NA is the same as the voltage of the fourth node C2NB, and the current of the inductor L reaches a maximum value. At this time, the voltage of the first node C1NA decreases to zero, a driving signal used to control the fifth power transistor Q5A is stopped, and the switched capacitor converter enters in the stage2.

Figure 6:
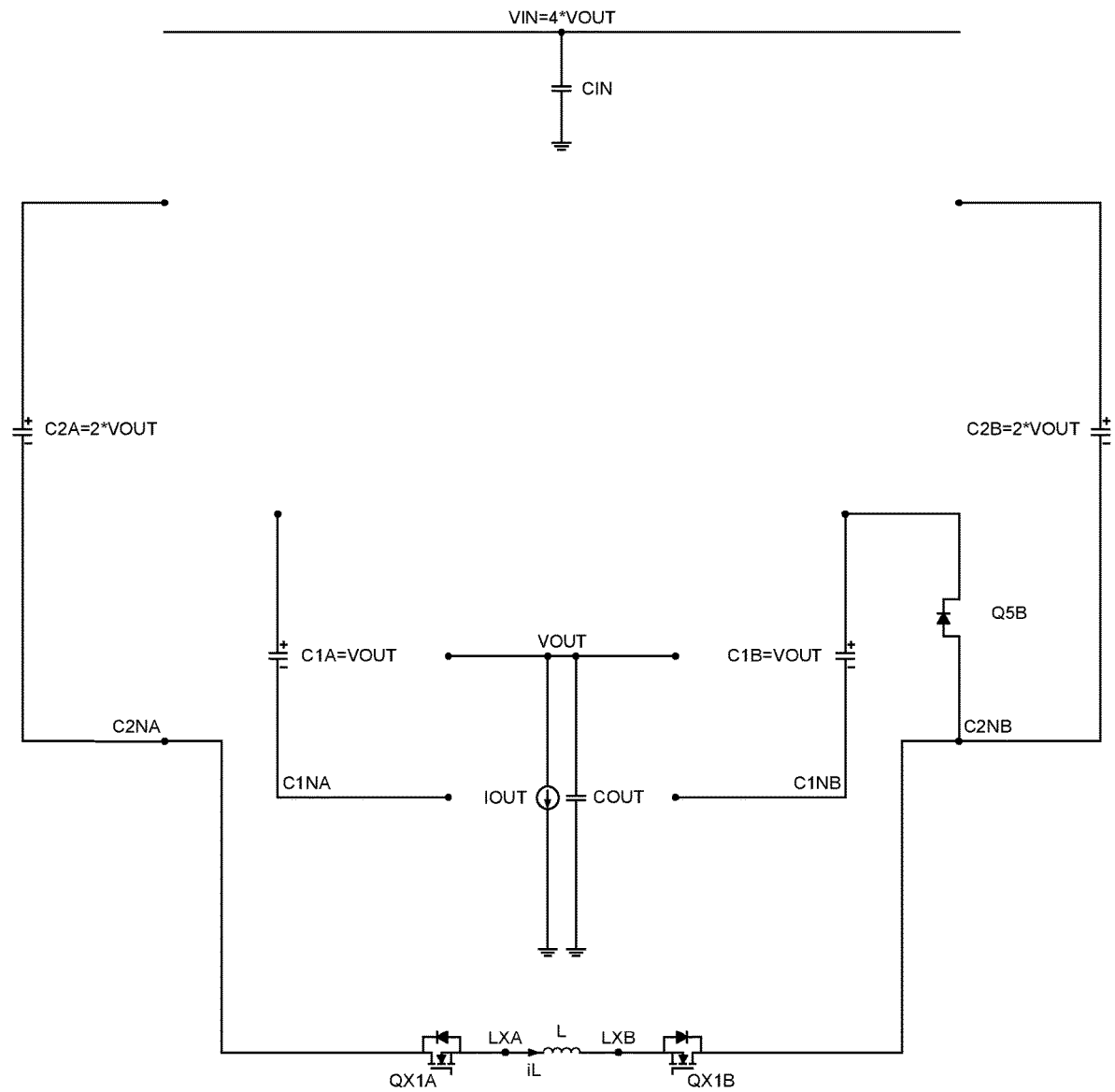
FIG. 6 is an equivalent circuit diagram of a 4:1 switched capacitor converter working in Stage 2 of an embodiment of the present application.

Stage 2 (t2-t3): As shown in FIG. 6, at the moment t2, the voltage of the second node C2NA is the same as the voltage of the fourth node C2NB, the current of the inductor L reaches the maximum value. At the moment t2, the fifth power transistor Q5A is turned off, therefore, all primary power transistors are turned off, the sixteenth power transistor QX2A and the seventeenth power transistor QX2B are turned off, the fifteenth power transistor QX1A and the eighteenth power transistor QX1B are turned on, and the parasitic capacitor of the second node C2NA, the parasitic capacitor of the fourth node C2NB and the inductor L remain resonating. At the moment t3, the voltage of the second node C2NA resonates to zero, the voltage of the fourth node C2NB resonates to 2*VOUT, and the current of the inductor L decreases to zero. The switched capacitor converter enters in the stage 3.

Figure 7:
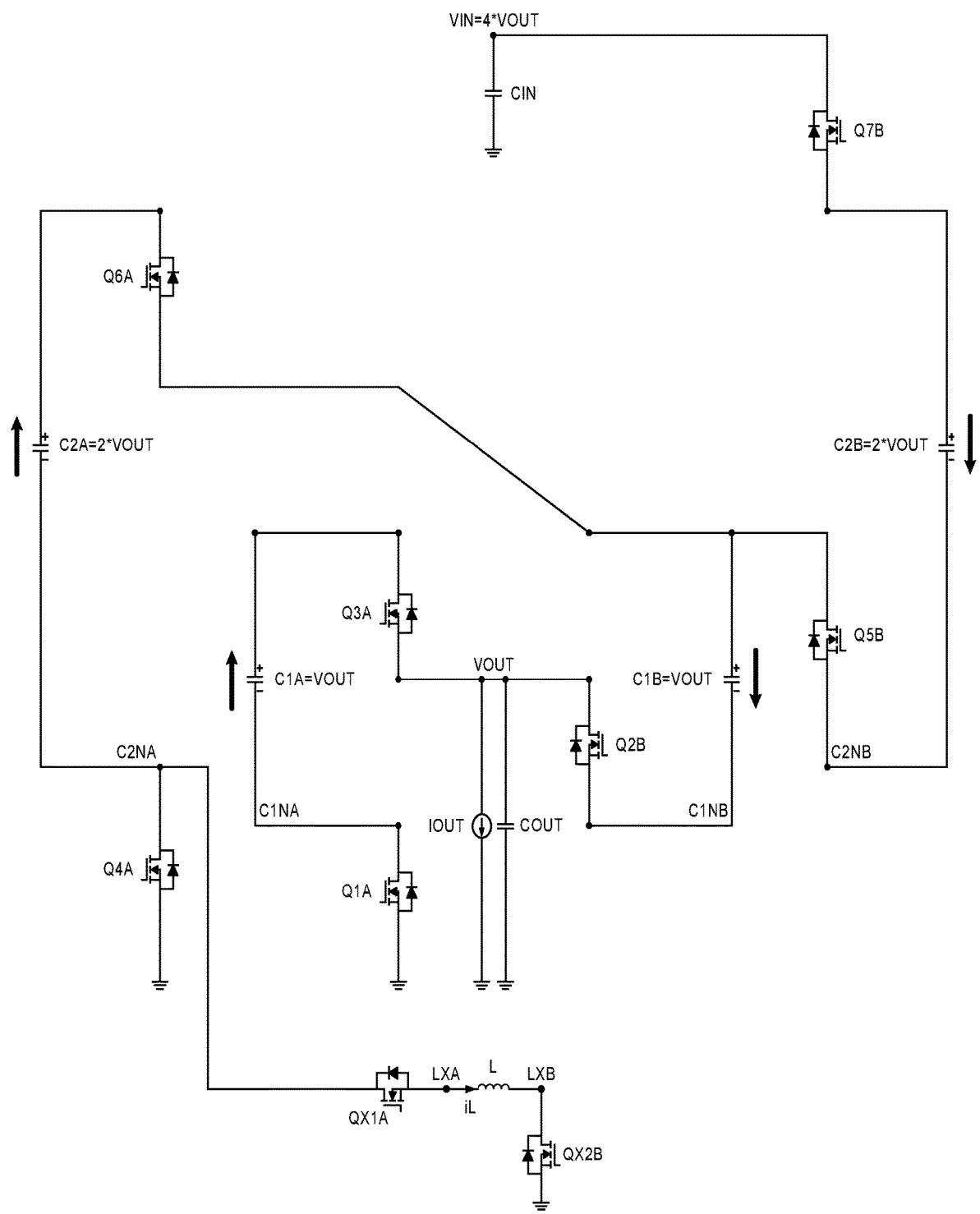
FIG. 7 is an equivalent circuit diagram of a 4:1 switched capacitor converter working in Stage 3 of an embodiment of the present application.

Stage 3 (t3-t4): As shown in FIG. 7, in the stage 3, the first power transistor Q1A, the ninth power transistor Q2B, the third power transistor Q3A, the fourth power transistor Q4A, the twelfth power transistor Q5B, the sixth power transistor Q6A and the fourteenth power transistor Q7B are turned on, and the eighth power transistor Q1B, the second power transistor Q2A, the tenth power transistor Q3B, the eleventh power transistor Q4B, the fifth power transistor Q5A, the thirteenth power transistor Q6B and the seventh power transistor Q7A remain turning off. The first capacitor C1A is in discharge state, the third capacitor C1B is in charge state, the second capacitor C2A is in charge state, and the fourth capacitor C2B is in discharge state. In the auxiliary circuit, the fifteenth power transistor QX1A and the seventeenth power transistor QX2B are turned on, and the eighteenth power transistor QX1B and the sixteenth power transistor QX2A are turned off. In this stage, the voltage of the third node C1NB is equal to the output voltage: VOUT, the voltage of the fourth node C2NB is equal to twice the output voltage: 2*VOUT, the voltages of the first node C1NA and the second node C2NA are zero, the voltages of the node LXA and the node LXB are zero, and the current flowing through the inductor L is zero.

Figure 8:
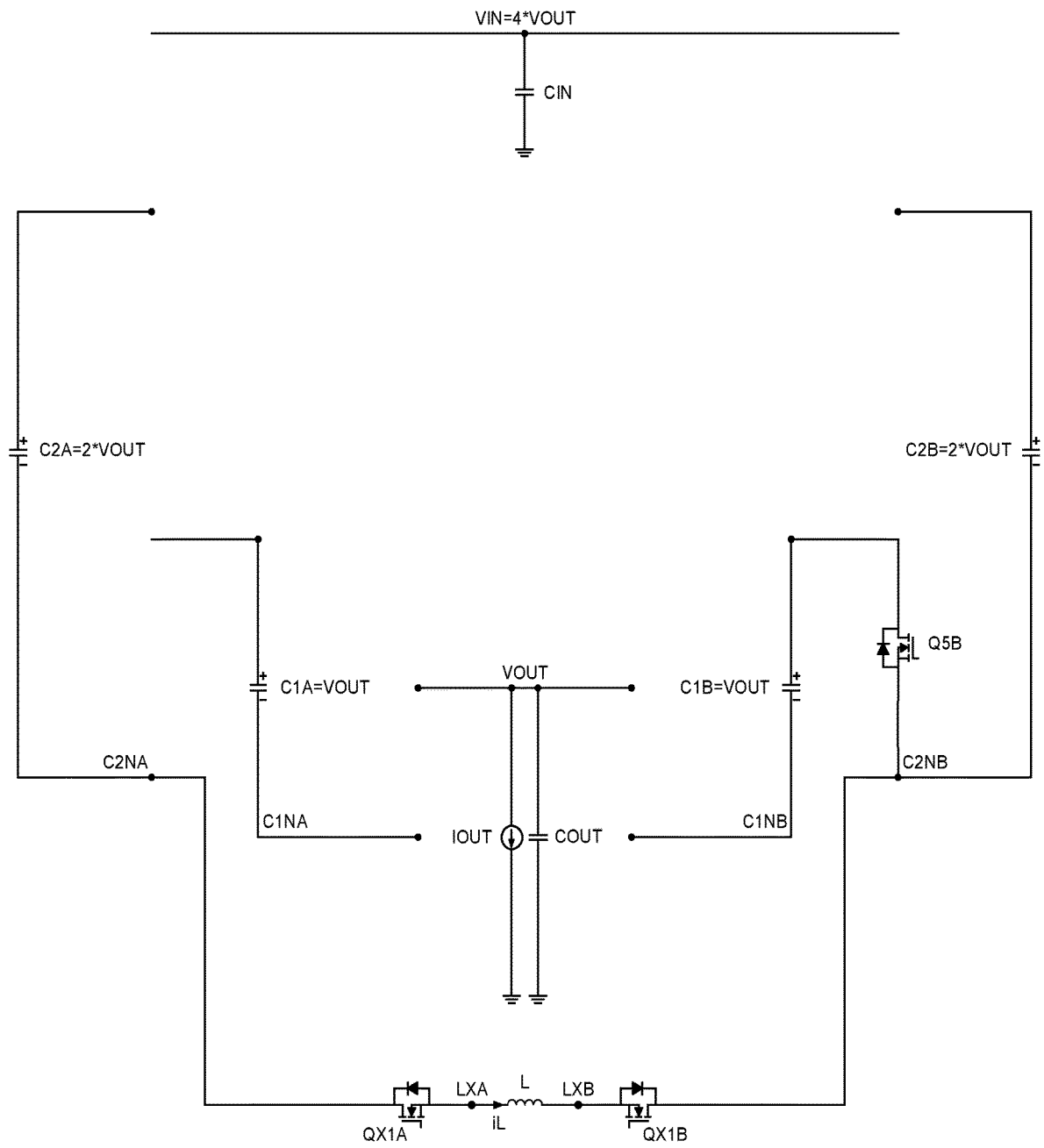
FIG. 8 is an equivalent circuit diagram of a 4:1 switched capacitor converter working in Stage 4 of an embodiment of the present application.

Stage 4 (t4-t5): As shown in FIG. 8, at the moment t4, the first power transistor Q1A, the ninth power transistor Q2B, the third power transistor Q3A, the fourth power transistor Q4A, the sixth power transistor Q6A and the fourteenth power transistor Q7B are turned off, the eighth power transistor Q1B, the second power transistor Q2A, the tenth power transistor Q3B, the eleventh power transistor Q4B, the fifth power transistor Q5A, the thirteenth power transistor Q6B and the seventh power transistor Q7A remain turning off, therefore, all the primary power transistors are turned off except for the twelfth power transistor Q5B which remains turning on. The first capacitor C1A, the third capacitor C1B, the second capacitor C2A and the fourth capacitor C2B stop charging or discharging and maintain respective current voltage differences. The load current is provided by the output capacitor COUT which is in discharge state. The sixteenth power transistor QX2A and the seventeenth power transistor QX2B are turned off, and the fifteenth power transistor QX1A and the eighteenth power transistor QX1B are turned on.

Before the moment t4, the voltage of the third node C1NB is VOUT, the voltage of the fourth node C2NB is 2*VOUT, and the voltages of the first node C1NA and the second node C2NA are zero. From the moment t4, the inductor L is connected between the second node C2NA and the fourth node C2NB, at this time, the parasitic capacitor of the second node C2NA, the parasitic capacitor of the fourth node C2NB and the inductor L start to resonate. The voltage of the fourth node C2NB syntonically decreases, and the voltage of the third node C1NB is driven to decrease by the twelfth power transistor Q5B. The voltage of the second node C2NA syntonically increases, and the voltage of the first node C1NA is driven to increase by the body diode of the fifth power transistor Q5A. The current of the inductor L increases gradually in negative direction. When the voltage of the fourth node C2NB decreases to VOUT, the voltage of the fourth node C2NB is the same as the voltage of the second node C2NA, and the current of the inductor L reaches a negative maximum value. At this time, the voltage of the third node C1NB decreases to zero, and a driving signal used to control the twelfth power transistor Q5B is stopped, and the switched capacitor converter enters in the stage 5.

Figure 9:
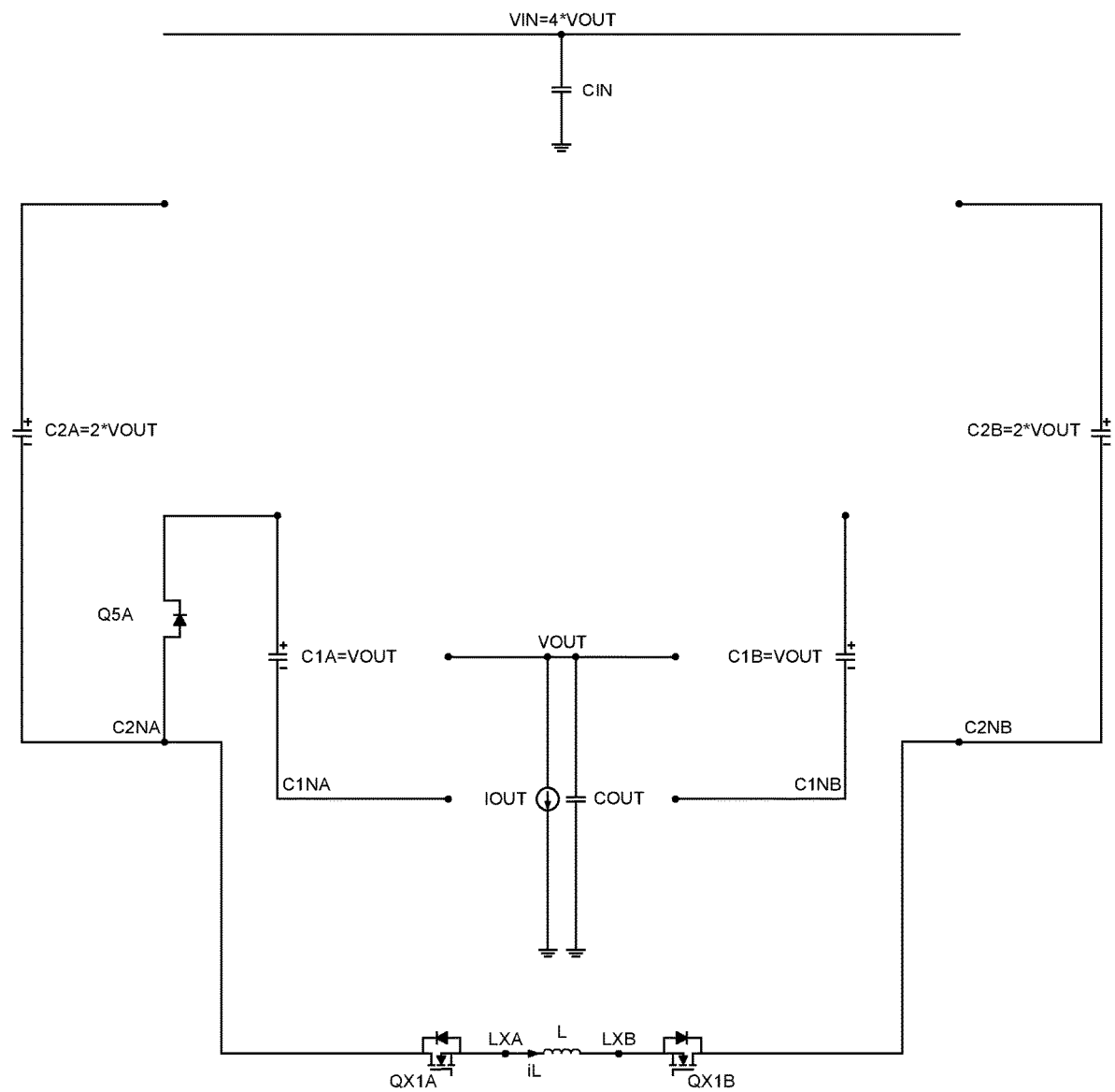
FIG. 9 is an equivalent circuit diagram of a 4:1 switched capacitor converter working in Stage 5 of an embodiment of the present application.

Stage 5 (t5-t0): As shown in FIG. 9, at the moment t5, the voltage of the second node C2NA is the same as the voltage of the fourth node C2NB, and the current of the inductor L reaches a negative maximum. At this time, the twelfth power transistor Q5B is turned off, therefore, all the primary power transistors are turn off, the sixteenth power transistor QX2A and the seventeenth power transistor QX2B are turned off, the fifteenth power transistor QX1A and the eighteenth power transistor QX1B are turned on, and the parasitic capacitor of the second node C2NA, the parasitic capacitor of the fourth node C2NB and the inductor L remain resonating. At the moment t0, the voltage of the fourth node C2NB resonates to zero, the voltage of the second node C2NA resonates to 2*VOUT, and the current of the inductor L decreases to zero, and the switched capacitor converter enters in the stage 0.

In the switched capacitor converter of the embodiments of the present application, the fifteenth power transistor QX1A, the sixteenth power transistor QX2A, the eighteenth power transistor QX1B and the seventeenth power transistor QX2B are controlled by the above-mentioned control sequence to transfer an electric charge or electric charges on the first node C1NA and the second node C2NA to the third node C1NB and the fourth node C2NB via the inductor L within the stage 1 and the stage 2, and to transfer the electric charge or the electric charges on the third node C1NB and the fourth node C2NB to the first node C1NA and the second node C2NA via the inductor L within the stage 4 and the stage 5, so that a voltage difference between both terminals of each of the first power transistor Q1A, the eighth power transistor Q1B, the second power transistor Q2A, the ninth power transistor Q2B, the third power transistor Q3A, the tenth power transistor Q3B, the fourth power transistor Q4A, the eleventh power transistor Q4B, the fifth power transistor Q5A, the twelfth power transistor Q5B, the sixth power transistor Q6A, the thirteenth power transistor Q6B, the seventh power transistor Q7A and the fourteenth power transistor Q7B is zero before these power transistors are turned on respectively, which greatly reduces the switching loss and improves the conversion efficiency of the switched capacitor converter.

Figure 10:
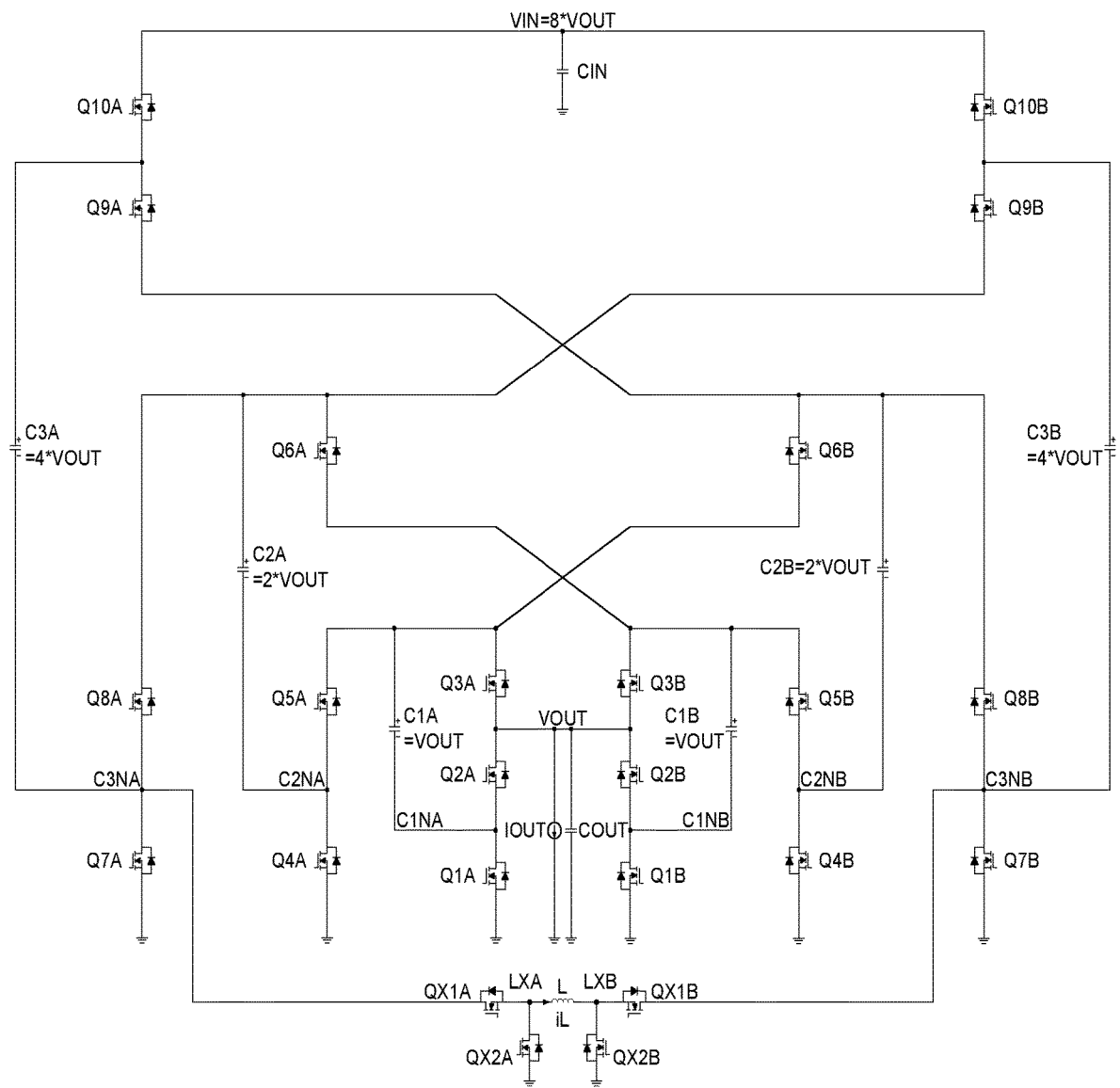
FIG. 10 is a schematic diagram showing a circuit structure of an 8:1 switched capacitor converter of an embodiment of the present application.

Based on the 4:1 switched capacitor converter shown in FIG. 2, an 8:1 switched capacitor converter can be realized by adding six primary power transistors and two capacitors, as shown in FIG. 10. An auxiliary circuit of the 8:1 switched capacitor converter is same as that of the auxiliary circuit as in FIG. 2 and a similar control mode can be used in the 8:1 switched capacitor converter to achieve zero voltage switching of all primary power transistors.

For example, the 8:1 switched capacitor converter as shown in FIG. 10 includes an auxiliary circuit, twenty primary power transistors (i.e., a first power transistor Q1A, a second power transistor Q2A, a third power transistor Q3A, a fourth power transistor Q4A, a fifth power transistor Q5A, a sixth power transistor Q6A, a seventh power transistor Q7A, a first sub power transistor Q8A, a third sub power transistor Q9A, a fifth sub power transistor Q10A, an eighth power transistor Q1B, a ninth power transistor Q2B, a tenth power transistor Q3B, an eleventh power transistor Q4B, a twelfth power transistor Q5B, a thirteenth power transistor Q6B, a fourteenth power transistor Q7B, a second sub power transistor Q8B, a fourth sub power transistor Q9B and a sixth sub power transistor Q10B), six capacitors (i.e., a first capacitor C1A, a second capacitor C2A, a third capacitor C1B, a fourth capacitor C2B, a first sub capacitor C3A and a second sub capacitor C3B), an input capacitor CIN, an output capacitor COUT and an output load IOUT. The auxiliary circuit includes four auxiliary power transistors (i.e., a fifteenth power transistor QX1A, a sixteenth power transistor QX2A, an eighteenth power transistor QX1B and a seventeenth power transistor QX2B) and an auxiliary inductor L.

A first branch of the 8:1 switched capacitor converter includes the first power transistor Q1A, the second power transistor Q2A, the third power transistor Q3A, the fourth power transistor Q4A, the fifth power transistor Q5A, the sixth power transistor Q6A, the seventh power transistor Q7A, the first sub power transistor Q8A, the third sub power transistor Q9A, the fifth sub power transistor Q10A, the first capacitor C1A, the second capacitor C2A and the first sub capacitor C3A. A second branch includes the eighth power transistor Q1B, the ninth power transistor Q2B, the tenth power transistor Q3B, the eleventh power transistor Q4B, the twelfth power transistor Q5B, the thirteenth power transistor Q6B, the fourteenth power transistor Q7B, the second sub power transistor Q8B, the fourth sub power transistor Q9B, the sixth sub power transistor Q10B, the third capacitor C1B, the fourth capacitor C2B and the second sub capacitor C3B.

A first terminal of the fifth sub power transistor Q10A and a first terminal of the sixth sub power transistor Q10B are connected to an input terminal of the 8:1 switched capacitor converter, the input terminal of the 8:1 switched capacitor converter is connected to an external input voltage, a second terminal of the fifth sub power transistor Q10A is connected to a first terminal of the first sub capacitor C3A and a first terminal of the third sub power transistor Q9A respectively, and a second terminal of the sixth sub power transistor Q10B is connected to a first terminal of the second sub capacitor C3B and a first terminal of the fourth sub power transistor Q9B respectively.

A second terminal of the third sub power transistor Q9A is connected to a first terminal of the thirteenth power transistor Q6B, a first terminal of the fourth capacitor C2B and a first terminal of the second sub power transistor Q8B respectively, and a second terminal of the fourth sub power transistor Q9B is connected to a first terminal of the sixth power transistor Q6A, a first terminal of the second capacitor C2A and a first terminal of the first sub power transistor Q8A respectively.

A second terminal of the sixth power transistor Q6A is connected to a first terminal of the tenth power transistor Q3B, a first terminal of the third capacitor C1B and a first terminal of the twelfth power transistor Q5B respectively, and a second terminal of the thirteenth power transistor Q6B is connected to a first terminal of the third power transistor Q3A, a first terminal of the first capacitor C1A and a first terminal of the fifth power transistor Q5A respectively.

A second terminal of the third power transistor Q3A is connected to a first terminal of the second power transistor Q2A, a second terminal of the second power transistor Q2A is connected to a second terminal of the first capacitor C1A and a first terminal of the first power transistor Q1A respectively, and a second terminal of the first power transistor Q1A is grounded.

A second terminal of the fifth power transistor Q5A is connected to a second terminal of the second capacitor C2A and a first terminal of the fourth power transistor Q4A respectively, and a second terminal of the fourth power transistor Q4A is grounded.

A second terminal of the first sub power transistor Q8A is connected to a second terminal of the first sub capacitor C3A and a first terminal of the seventh power transistor Q7A, and a second terminal of the seventh power transistor Q7A is grounded.

A second terminal of the tenth power transistor Q3B is connected to a first terminal of the ninth power transistor Q2B, a second terminal of the ninth power transistor Q2B is connected to a second terminal of the third capacitor C1B and a first terminal of the eighth power transistor Q1B respectively, and a second terminal of the eighth power transistor Q1B is grounded.

A second terminal of the twelfth power transistor Q5B is connected a second terminal of the fourth capacitor C2B and a first terminal of the eleventh power transistor Q4B, and a second terminal of the eleventh power transistor Q4B is grounded.

A second terminal of the second sub power transistor Q8B is connected to a second terminal of the second sub capacitor C3B and a first terminal of the fourteenth power transistor Q7B, and a second terminal of the fourteenth power transistor Q7B is grounded.

The second terminal of the third power transistor Q3A, the first terminal of the second power transistor Q2A, the second terminal of the tenth power transistor Q3B and the second terminal of the ninth power transistor Q2B are connected to the output terminal of the switched capacitor converter.

The second terminal of the first sub capacitor C3A, the second terminal of the first sub power transistor Q8A and the first terminal of the seventh power transistor Q7A are connected to a first sub node C3NA, and the second terminal of the second sub capacitor C3B, the second terminal of the second sub power transistor Q8B and the first terminal of the fourteenth power transistor Q7B are connected to a second sub node C3NB.

Both terminals of the auxiliary circuit are connected to the first sub node C3NA and the second sub node C3NB respectively, and the circuit structure of the auxiliary circuit of the embodiment of FIG. 10 is same as that of the auxiliary circuit of FIG. 2.

Figure 11:
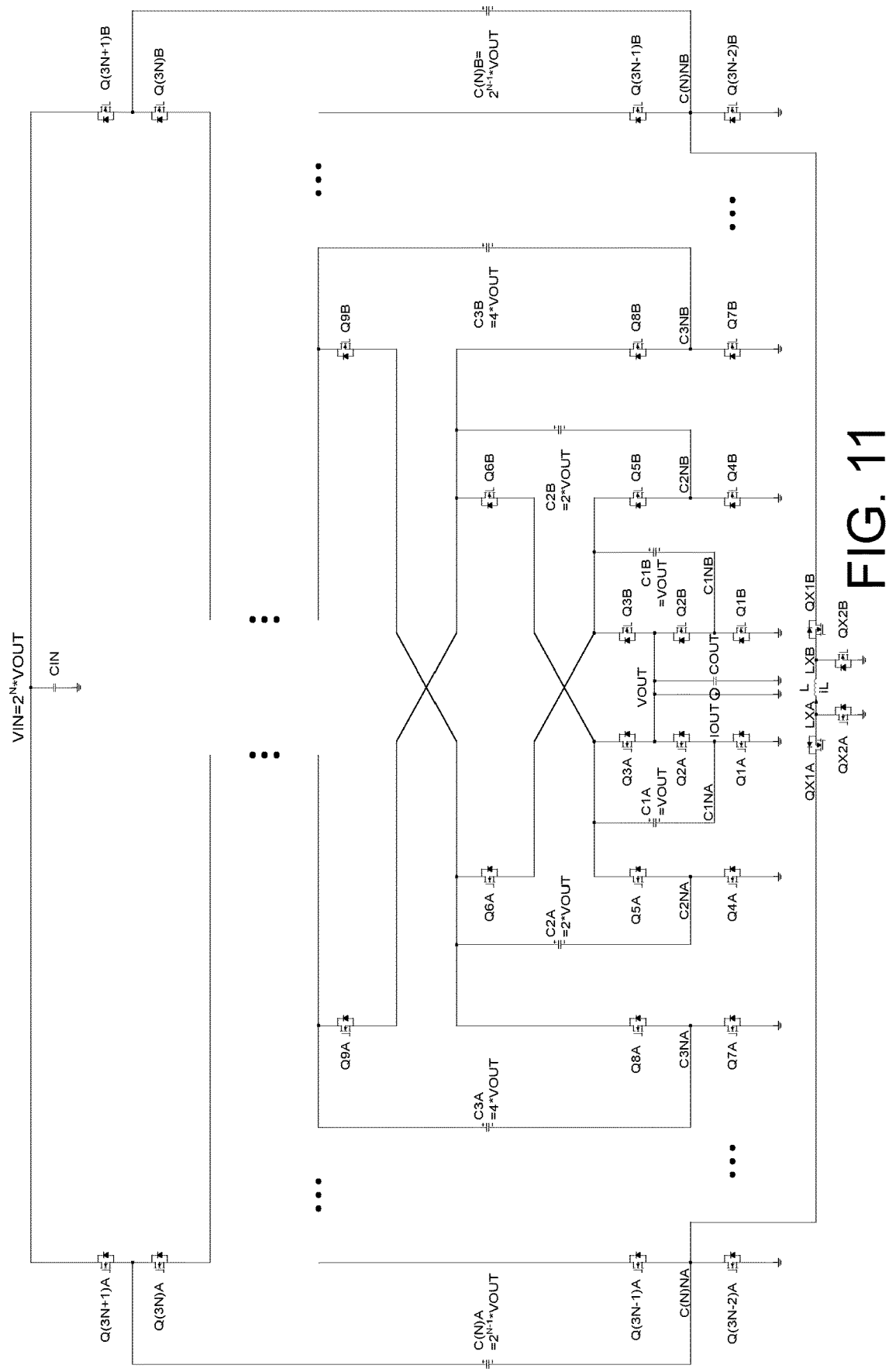
FIG. 11 is a schematic diagram showing a circuit structure of a $2^N:1$ switched capacitor converter of an embodiment of the present application.

Based on the 4:1 switched capacitor converter shown in FIG. 2, a $2^N$:1 switched capacitor converter can be realized by further adding more primary power transistors and capacitors, as shown in FIG. 11. The circuit structure of the auxiliary circuit of the embodiment of FIG. 11 is same as that of the auxiliary circuit as shown in FIG. 2 and a similar control mode can be used in the $2^N$:1 switched capacitor converter to achieve zero voltage switching of all primary power transistors. N is an integer which is greater than or equal to 2.

When N=2, the $2^N$:1 switched capacitor converter is the 4:1 switched capacitor converter as shown in FIG. 2, when N=3, the $2^N$:1 switched capacitor converter is the 8:1 switched capacitor converter as shown in FIG. 10. When N is an integer greater than or equal to 4, a circuit of the $2^N$:1 switched capacitor converter is shown in FIG. 11.

As shown in FIG. 11, the $2^N$:1 switched capacitor converter includes an auxiliary circuit, a first branch and a second branch, the first branch includes a first power transistor Q1A, a second power transistor Q2A, a third power transistor Q3A, a first capacitor C1A, N−1 first basic units and a first inputting power transistor Q(3N+1)A, and the second branch includes an eighth power transistor Q1B, a ninth power transistor Q2B, a tenth power transistor Q3B, a third capacitor C1B, N−1 second basic units and a second inputting power transistor Q(3N+1)B.

A first terminal of the first power transistor Q1A is connected to a second terminal of the second power transistor Q2A and a second terminal of the first capacitor C1A respectively, a second terminal of the first power transistor Q1A is grounded, a first terminal of the first capacitor C1A and a first terminal of the third power transistor Q3A are connected to a first connection node, and a first terminal of the second power transistor Q2A and a second terminal of the third power transistor Q3A are connected to an output terminal of the $2^N$:1 switched capacitor converter. A first terminal of the eighth power transistor Q1B is connected to a second terminal of the ninth power transistor Q2B and a second terminal of the third capacitor C1B respectively, a second terminal of the eighth power transistor Q1B is grounded, a first terminal of the third capacitor C1B and a first terminal of the tenth power transistor Q3B are connected to a second connection node, and a first terminal of the ninth power transistor Q2B and a second terminal of the tenth power transistor Q3B are connected to the output terminal of the $2^N$:1 switched capacitor converter.

A first terminal of the first inputting power transistor Q(3N+1)A and a first terminal of the second inputting power transistor Q(3N+1)B are connected to an input terminal of the $2^N$:1 switched capacitor converter, a second terminal of the first inputting power transistor Q(3N+1)A is connected to the first connection node and the second connection node respectively through the N−1 first basic units in turn according to a sequence from a level N−1-th first basic unit to a level 1-th first basic unit, and a second terminal of the second inputting power transistor Q(3N+1)B is connected to the first connection node and the second connection node respectively through the N−1 second basic units in turn according to a sequence from a level N−1-th second basic unit to a level 1-th second basic unit. The second terminal of the first inputting power transistor Q(3N+1)A is connected to the level N−1-th first basic unit, and the level 1-th first basic unit is connected to the first connection node and the second connection node respectively; and the second terminal of the second inputting power transistor Q(3N+1)B is connected to the level N−1-th second basic unit, and the level 1-th second basic unit is connected to the first connection node and the second connection node respectively.

Each of the N−1 first basic units has a first terminal, a second terminal and a third terminal, and each of the N−1 second basic units has a first terminal, a second terminal and a third terminal.

The second terminal of the first inputting power transistor Q(3N+1)A is connected to a first terminal of the level N−1-th first basic unit, and the second terminal of the second inputting power transistor Q(3N+1)B is connected to a first terminal of the level N−1-th second basic unit.

The first connection node is connected to a third terminal of the level 1-th first basic unit and a second terminal of the level 1-th second basic unit respectively, and the second connection node is connected to a third terminal of the level 1-th second basic unit and a second terminal of the level 1-th first basic unit respectively.

In the first branch, except for the first terminal of the level N−1-th first basic unit and the second terminal and the third terminal of the level 1-th first basic unit, a first terminal of a current level first basic unit is connected to a third terminal of a previous level first basic unit and a second terminal of a previous level second basic unit respectively, the current level first basic unit is one of the level 1-th first basic unit to the level N−1-th first basic unit, a second terminal of the current level first basic unit is connected to a first terminal of a next level second basic unit, and a third terminal of the current level first basic unit is connected to a first terminal of a next level first basic unit.

In the second branch, except for the first terminal of the level N−1-th second basic unit and the second terminal and the third terminal of the level 1-th second basic unit, a first terminal of a current level second basic unit is connected to a third terminal of the previous level second basic unit and of a second terminal of the previous level first basic unit respectively, the current level second basic unit is one of the level 1-th second basic unit to the level N−1-th second basic unit, a second terminal of the current level second basic unit is connected to the first terminal of the next level first basic unit, and a third terminal of the current level second basic unit is connected to the first terminal of the next level second basic unit.

For example, each first basic unit includes a first unit power transistor, a second unit power transistor, a third unit power transistor and a first unit capacitor, a first terminal of the first unit capacitor and a first terminal of the third unit power transistor are connected as a first terminal of the each first basic unit, a second terminal of the third unit power transistor is a second terminal of the each first basic unit, a second terminal of the first unit capacitor is connected to a first terminal of the first unit power transistor and a second terminal of the second unit power transistor respectively, a first terminal of the second unit power transistor is a third terminal of the each first basic unit, and a second terminal of the first unit power transistor is grounded.

For example, a first unit power transistor, a second unit power transistor, a third unit power transistor and a first unit capacitor of the level 1-th first basic unit are the fourth power transistor Q4A, the fifth power transistor Q5A, the sixth power transistor Q6A and the second capacitor C2A respectively.

For example, a first unit power transistor, a second unit power transistor, a third unit power transistor and a first unit capacitor of the level 2-th first basic unit are the seventh power transistor Q7A, the first sub power transistor Q8A, the third sub power transistor Q9A and the first sub capacitor C3A respectively.

For example, a first unit power transistor, a second unit power transistor, a third unit power transistor and a first unit capacitor of the level N−1-th first basic unit are a 3M−4-th sub power transistor Q(3N−2)A, a 3M−2-th sub power transistor Q(3N−1)A, a 3M-th sub power transistor Q(3N)A and a M-th sub capacitor C(N)A respectively, M=2(N−2)−1.

For example, each second basic unit includes a fourth unit power transistor, a fifth unit power transistor, a sixth unit power transistor and a second unit capacitor, a first terminal of the second unit capacitor and a first terminal of the sixth unit power transistor are connected as a first terminal of the each second basic unit, a second terminal of the sixth unit power transistor is a second terminal of the each second basic unit, a second terminal of the second unit capacitor is connected to a first terminal of the fourth unit power transistor and a second terminal of the fifth unit power transistor respectively, a first terminal of the fifth unit power transistor is a third terminal of the each second basic unit, and a second terminal of the fourth unit power transistor is grounded.

For example, a fourth unit power transistor, a fifth unit power transistor, a sixth unit power transistor and a second unit capacitor of the level 1-th second basic unit are the eleventh power transistor Q4B, the twelfth power transistor Q5B, the thirteenth power transistor Q6B and the fourth capacitor C2B respectively.

For example, a fourth unit power transistor, a fifth unit power transistor, a sixth unit power transistor and a second unit capacitor of the level 2-th second basic unit are the fourteenth power transistor Q7B, the second sub power transistor Q8B, the fourth sub power transistor Q9B and the second sub capacitor C3B respectively.

For example, a fourth unit power transistor, a fifth unit power transistor, a sixth unit power transistor and a second unit capacitor of the level N−1-th second basic unit are a 3K−6-th sub power transistor Q(3N−2)B, a 3K−4-th sub power transistor Q(3N−1)B, a 3K−2-th sub power transistor Q(3N)B and a K-th sub capacitor C(N)B respectively, K=2(N−2).

Both terminals of the auxiliary circuit are connected to a connection node C(N)NA which is connected to the first unit power transistor and the second unit power transistor of the level N−1-th first basic unit and a connection node C(N)NB which is connected to the fourth unit power transistor and the fifth unit power transistor of the level N−1-th second basic unit respectively.

In steady state working conditions, the input voltage VIN of the $2^N:1$ switched capacitor converter is $2^N*\text{VOUT}$, voltage differences of the first capacitor C1A, the second capacitor C2A, the first sub capacitor C3A, ..., the M-th sub capacitor C(N)A are VOUT, 2*VOUT, 4*VOUT, ..., $2^{(N-1)}*\text{VOUT}$ respectively, and voltage differences of the third capacitor C1B, the fourth capacitor C2B, the second sub capacitor C3B, ..., the K-th sub capacitor C(N)B are VOUT, 2*VOUT, 4*VOUT, ..., $2^{(N-1)}*\text{VOUT}$ respectively.

In all embodiments of the present application, all power transistors and sub power transistors in the first branch and the second branch are primary power transistors, and each of the primary power transistors has a parasitic capacitor. Furthermore, the power transistors are switch transistors or diodes.

In circuit structures shown in FIGS. 10 and 11, after the auxiliary circuit is connected between two branches at the outermost side, i.e. between the last first basic unit and the last second basic unit, the circuit structures of the auxiliary circuit of FIGS. 10 and 11 are same as that of the auxiliary circuit of FIG. 2.

The auxiliary circuit shown in FIG. 2 includes four NMOS and an inductor, and it can be realized that the electric charges at one branch can be transferred to another branch by controlling the auxiliary circuit during the dead time when all the primary power transistors are turned off, so as to realize all the primary power transistors turn on at zero voltage and reduce switching loss. Besides the auxiliary circuit of FIG. 2, which can perform this function, various other types of circuits can also perform the function of the zero voltage switching. A variety of different auxiliary circuits are as shown in FIG. 12.

Figure 12:
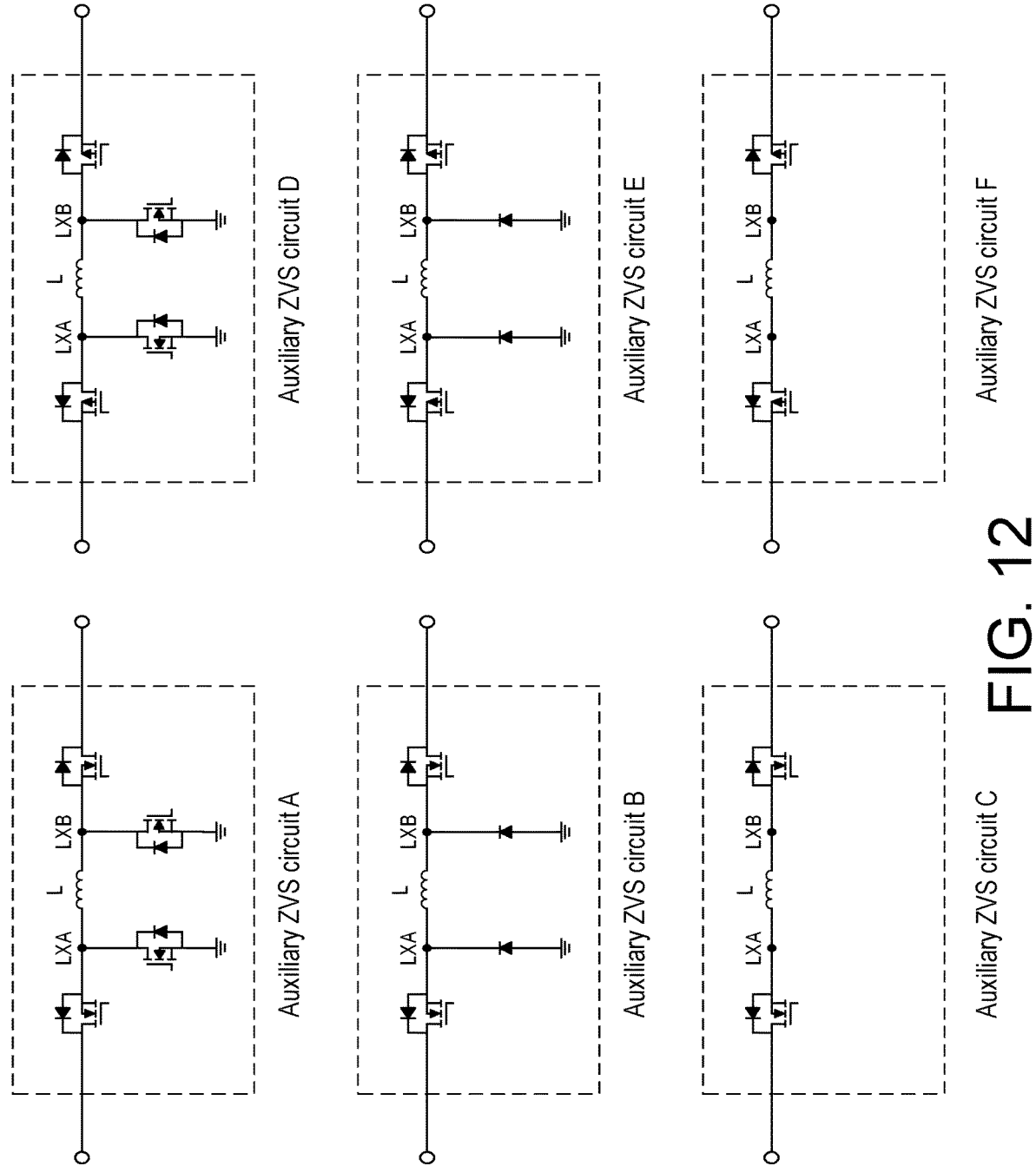
FIG. 12 is a schematic diagram showing circuit structures of various auxiliary circuits of an embodiment of the present application.

As shown in FIG. 12, an auxiliary circuit includes a fifteenth power transistor, a sixteenth power transistor, a seventeenth power transistor, an eighteenth power transistor and an inductor L. A first terminal of the fifteenth power transistor is connected to the first branch, a second terminal of the fifteenth power transistor is connected to a first terminal of the inductor L and a first terminal of the sixteenth power transistor respectively, and a second terminal of the sixteenth power transistor is grounded. A second terminal of the inductor L is connected to a first terminal of the seventeenth power transistor and a first terminal of the eighteenth power transistor respectively, a second terminal of the seventeenth power transistor is grounded, and a second terminal of the eighteenth power transistor is connected to the second branch. When the fifteenth power transistor, the sixteenth power transistor, the seventeenth power transistor and the eighteenth power transistor are N-type power transistors, the auxiliary circuit is shown by an auxiliary ZVS circuit A of FIG. 12, when the fifteenth power transistor and the eighteenth power transistor are P-type power transistors, and the sixteenth power transistor and the seventeenth power transistor are N-type power transistors, the auxiliary circuit is shown by an auxiliary ZVS circuit D of FIG. 12.

According to another embodiment of the present application, as shown in FIG. 12, the auxiliary circuit includes a fifteenth power transistor, a sixteenth power transistor, a first diode, a second diode and an inductor; a first terminal of the fifteenth power transistor is connected to the first branch, a second terminal of the fifteenth power transistor is connected to a first terminal of the first diode and a first terminal of the inductor, a second terminal of the first diode is grounded, the first terminal of the first diode is a cathode, and the second terminal of the first diode is an anode; a second terminal of the inductor is connected to a first terminal of the second diode and a first terminal of the sixteenth power transistor, a second terminal of the second diode is grounded, the first terminal of the second diode is a cathode, the second terminal of the second diode is an anode, and a second terminal of the sixteenth power transistor is connected to the second branch. When the fifteenth power transistor and the sixteenth power transistor are N-type power transistors, the auxiliary circuit is shown by an auxiliary ZVS circuit B of FIG. 12, when the fifteenth power transistor and the sixteenth power transistor are P-type power transistors, the auxiliary circuit is shown by an auxiliary ZVS circuit E of FIG. 12.

According to another embodiment of the present application, as shown in FIG. 12, the auxiliary circuit includes a fifteenth power transistor, a sixteenth power transistor and an inductor, a first terminal of the fifteenth power transistor is connected to the first branch, a second terminal of the fifteenth power transistor is connected to a first terminal of the inductor, a second terminal of the inductor is connected to a first terminal of the sixteenth power transistor, and a second terminal of the sixteenth power transistor is connected to the second branch. When the fifteenth power transistor and the sixteenth power transistor are N-type power transistors, the auxiliary circuit is shown by an auxiliary ZVS circuit C of FIG. 12, when the fifteenth power transistor and the sixteenth power transistor are P-type power transistors, the auxiliary circuit is shown by an auxiliary ZVS circuit F of FIG. 12.

Since the specific implementations of the circuits are diverse, various modifications, variations or equivalents of the above examples can be readily envisioned by those skilled in the art after understanding the present disclosure, and still be subject to the limitations set forth in the claims and any equivalents thereof.

What is claimed is:

1. A switched capacitor converter, comprising an auxiliary circuit, a first branch and a second branch, wherein the auxiliary circuit is connected between the first branch and the second branch, all power transistors of the first branch and the second branch are primary power transistors, and the auxiliary circuit is configured to transfer a charge or electric charges on one of the first branch and the second branch to another of the first branch and the second branch during a dead time when the primary power transistors are turned off, so that voltage difference of both terminals of each of the primary power transistors becomes zero, and the primary power transistors are turned on under zero voltage respectively;

wherein the auxiliary circuit comprises a fifteenth power transistor, a sixteenth power transistor, a seventeenth power transistor, an eighteenth power transistor and an inductor;

a first terminal of the fifteenth power transistor is connected to the first branch, a second terminal of the fifteenth power transistor is connected to a first terminal of the inductor and a first terminal of the sixteenth power transistor respectively, and a second terminal of the sixteenth power transistor is grounded; and a second terminal of the inductor is connected to a first terminal of the seventeenth power transistor and a first terminal of the eighteenth power transistor respectively, a second terminal of the seventeenth power transistor is grounded, and a second terminal of the eighteenth power transistor is connected to the second branch.

2. The switched capacitor converter according to claim 1, wherein the switched capacitor converter is a 4:1 switched capacitor converter, the first branch comprises a first power transistor, a second power transistor, a third power transistor, a fourth power transistor, a fifth power transistor, a sixth power transistor, a seventh power transistor, a first capacitor and a second capacitor, and the second branch includes an eighth power transistor, a ninth power transistor, a tenth power transistor, an eleventh power transistor, a twelfth power transistor, a thirteenth power transistor, a fourteenth power transistor, a third capacitor and a fourth capacitor;
- a first terminal of the seventh power transistor and a first terminal of the fourteenth power transistor are connected as an input terminal of the switched capacitor converter, the input terminal is connected to an external input voltage, a second terminal of the seventh power transistor is connected to a first terminal of the sixth power transistor and a first terminal of the second capacitor respectively, and a second terminal of the fourteenth power transistor is connected to a first terminal of the thirteenth power transistor and a first terminal of the fourth capacitor respectively;
- a second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively;
- a second terminal of the fifth power transistor is connected to a first terminal of the fourth power transistor and a second terminal of the second capacitor, a second terminal of the twelfth power transistor is connected to a first terminal of the eleventh power transistor and a second terminal of the fourth capacitor respectively, and a second terminal of the fourth power transistor and a second terminal of the eleventh power transistor are grounded;
- a second terminal of the third power transistor is connected to a first terminal of the second power transistor, a second terminal of the second power transistor is connected to a first terminal of the first power transistor and a second terminal of the first capacitor respectively, and a second terminal of the first power transistor is grounded;
- a second terminal of the tenth power transistor is connected to a first terminal of the ninth power transistor, a second terminal of the ninth power transistor is connected to a first terminal of the eighth power transistor and a second terminal of the third capacitor respectively, and a second terminal of the eighth power transistor is grounded;
- the second terminal of the third power transistor, the first terminal of the second power transistor, the first terminal of the ninth power transistor and the second terminal of the tenth power transistor are connected as an output terminal of the switched capacitor converter;
- the second terminal of the second capacitor, the second terminal of the fifth power transistor and the first terminal of the fourth power transistor are connected as a second node, and the second terminal of the fourth capacitor, the second terminal of the twelfth power transistor and the first terminal of the eleventh power transistor are connected as a fourth node; and
- both terminals of the auxiliary circuit are connected to the second node and the fourth node respectively.

3. The switched capacitor converter according to claim 2, wherein a working sequence of the switched capacitor converter comprises six stages as follows: a first stage: the second power transistor, the fifth power transistor, the seventh power transistor, the eighth power transistor, the tenth power transistor, the eleventh power transistor, the thirteenth power transistor, the sixteenth power transistor and the eighteenth power transistor are turned on, and remaining power transistors are turned off; the first capacitor and the second capacitor are in a charging state, the third capacitor and the fourth capacitor are in a discharging state, and a current on the inductor is 0; a second stage: the fifth power transistor, the fifteenth power transistor and the eighteenth power transistor are turned on, and remaining power transistors are turned off; the current on the inductor increases, and the second stage ends when the current on the inductor increases to a maximum value; a third stage: the fifteenth power transistor and the eighteenth power transistor are turned on, and remaining power transistors are turned off; the current on the inductor decreases, and the third stage ends when the current on the inductor decreases to 0; a fourth stage: the first power transistor, the third power transistor, the fourth power transistor, the sixth power transistor, the ninth power transistor, the twelfth power transistor, the fourteenth power transistor, the fifteenth power transistor and the seventeenth power transistor are turned on, and remaining power transistors are turned off; the first capacitor and the fourth capacitor are in the discharging state, and the second capacitor and the third capacitor are in the charging state; and the current on the inductor is 0; a fifth stage: the twelfth power transistor, the fifteenth power transistor and the eighteenth power transistor are turned on, and remaining power transistors are turned off; and the current on the inductor increases, and the fifth stage ends when the current on the inductor increases to the maximum value; and a sixth stage: the fifteenth power transistor and the eighteenth power transistor are turned on, and remaining power transistors are turned off; and the current on the inductor decreases, and the sixth stage ends when the current on the inductor decreases to 0, and returning to the first stage.

4. The switched capacitor converter according to claim 2, wherein the fifteenth power transistor, the sixteenth power transistor, the seventeenth power transistor and the eighteenth power transistor are N-type power transistors; or the sixteenth power transistor and the eighteenth power transistor are P-type power transistors, and the sixteenth power transistor and the seventeenth power transistor are N-type power transistors.

5. The switched capacitor converter according to claim 1, wherein the switched capacitor converter is a 8:1 switched capacitor converter, the first branch comprises a first power transistor, a second power transistor, a third power transistor, a fourth power transistor, a fifth power transistor, a sixth power transistor, a seventh power transistor, a first sub power transistor, a third sub power transistor, a fifth sub power transistor, a first capacitor, a second capacitor and a first sub capacitor;
- the second branch includes an eighth power transistor, a ninth power transistor, a tenth power transistor, an eleventh power transistor, a twelfth power transistor, a thirteenth power transistor, a fourteenth power transistor, a second sub power transistor, a fourth sub power transistor, a sixth sub power transistor, a third capacitor, a fourth capacitor and a second sub capacitor;
- a first terminal of the fifth sub power transistor and a first terminal of the sixth sub power transistor are connected as an input terminal of the switched capacitor converter, the input terminal of the switched capacitor converter is connected to an external input voltage, a second terminal of the fifth sub power transistor is connected to a first terminal of the first sub capacitor and a first terminal of the third sub power transistor respectively, and a second terminal of the sixth sub power transistor is connected to a first terminal of the second sub capacitor and a first terminal of the fourth sub power transistor respectively;

a second terminal of the third sub power transistor is connected to a first terminal of the thirteenth power transistor, a first terminal of the fourth capacitor and a first terminal of the second sub power transistor respectively, and a second terminal of the fourth sub power transistor is connected to a first terminal of the sixth power transistor, a first terminal of the second capacitor and a first terminal of the first sub power transistor respectively;

a second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively;

a second terminal of the third power transistor is connected to a first terminal of the second power transistor, a second terminal of the second power transistor is connected to a second terminal of the first capacitor and a first terminal of the first power transistor respectively, and a second terminal of the first power transistor is grounded;

a second terminal of the fifth power transistor is connected to a second terminal of the second capacitor and a first terminal of the fourth power transistor respectively, and a second terminal of the fourth power transistor is grounded;

a second terminal of the first sub power transistor is connected to a second terminal of the first sub capacitor and a first terminal of the seventh power transistor, and a second terminal of the seventh power transistor is grounded;

a second terminal of the tenth power transistor is connected to a first terminal of the ninth power transistor, a second terminal of the ninth power transistor is connected to a second terminal of the third capacitor and a first terminal of the eighth power transistor respectively, and a second terminal of the eighth power transistor is grounded;

a second terminal of the twelfth power transistor is connected a second terminal of the fourth capacitor and a first terminal of the eleventh power transistor, and a second terminal of the eleventh power transistor is grounded;

a second terminal of the second sub power transistor is connected to a second terminal of the second sub capacitor and a first terminal of the fourteenth power transistor, and a second terminal of the fourteenth power transistor is grounded;

the second terminal of the third power transistor, the first terminal of the second power transistor, the second terminal of the tenth power transistor and the second terminal of the ninth power transistor are connected to the output terminal of the switched capacitor converter;

the second terminal of the first sub capacitor, the second terminal of the first sub power transistor and the first terminal of the seventh power transistor are connected as a first sub node, and the second terminal of the second sub capacitor, the second terminal of the second sub power transistor and the first terminal of the fourteenth power transistor are connected as a second sub node; and both terminals of the auxiliary circuit are connected to the first sub node and the second sub node respectively.

6. The switched capacitor converter according to claim 1, wherein N is an integer greater than or equal to 4, the switched capacitor converter is a 2N:1 switched capacitor converter, the first branch includes a first power transistor, a second power transistor, a third power transistor, a first capacitor, N−1 first basic units and a first inputting power transistor, and the second branch includes an eighth power transistor, a ninth power transistor, a tenth power transistor, a third capacitor, N−1 second basic units and a second inputting power transistor;

a first terminal of the first power transistor is connected to a second terminal of the second power transistor and a second terminal of the first capacitor respectively, a second terminal of the first power transistor is grounded, a first terminal of the first capacitor and a first terminal of the third power transistor are connected to a first connection node, and a first terminal of the second power transistor and a second terminal of the third power transistor are connected to an output terminal of the switched capacitor converter;

a first terminal of the eighth power transistor is connected to a second terminal of the ninth power transistor and a second terminal of the third capacitor respectively, a second terminal of the eighth power transistor is grounded, a first terminal of the third capacitor and a first terminal of the tenth power transistor are connected to a second connection node, and a first terminal of the ninth power transistor and a second terminal of the tenth power transistor are connected to the output terminal of the switched capacitor converter;

a first terminal of the first inputting power transistor and a first terminal of the second inputting power transistor are connected to an input terminal of the switched capacitor converter, a second terminal of the first inputting power transistor is connected to the first connection node and the second connection node respectively through the N−1 first basic units in turn according to a sequence from a level N−1-th first basic unit to a level 1-th first basic unit, and a second terminal of the second inputting power transistor is connected to the first connection node and the second connection node respectively through the N−1 second basic units in turn according to a sequence from a level N−1-th second basic unit to a level 1-th second basic unit; and the second terminal of the first inputting power transistor is connected to the level N−1-th first basic unit, and the level 1-th first basic unit is connected to the first connection node and the second connection node respectively; and the second terminal of the second inputting power transistor is connected to the level N−1-th second basic unit, and the level 1-th second basic unit is connected to the first connection node and the second connection node respectively.

7. The switched capacitor converter according to claim 6, wherein each of the N−1 first basic units has a first terminal, a second terminal and a third terminal, and each of the N−1 second basic units has a first terminal, a second terminal and a third terminal;

the second terminal of the first inputting power transistor is connected to a first terminal of the level N−1-th first basic unit, and the second terminal of the second inputting power transistor is connected to a first terminal of the level N−1-th second basic unit;

the first connection node is connected to a third terminal of the level 1-th first basic unit and a second terminal of the level 1-th second basic unit respectively, and the second connection node is connected to a third terminal of the level 1-th second basic unit and a second terminal of the level 1-th first basic unit respectively;

in the first branch, except for the first terminal of the level N−1-th first basic unit and the second terminal and the third terminal of the level 1-th first basic unit, a first terminal of a current level first basic unit is connected to a third terminal of a previous level first basic unit and a second terminal of a previous level second basic unit respectively, the current level first basic unit is one of the level 1-th first basic unit to the level N−1-th first basic unit, a second terminal of the current level first basic unit is connected to a first terminal of a next level second basic unit, and a third terminal of the current level first basic unit is connected to a first terminal of a next level first basic unit; and in the second branch, except for the first terminal of the level N−1-th second basic unit and the second terminal and the third terminal of the level 1-th second basic unit, a first terminal of a current level second basic unit is connected to a third terminal of the previous level second basic unit and of a second terminal of the previous level first basic unit respectively, the current level second basic unit is one of the level 1-th second basic unit to the level N−1-th second basic unit, a second terminal of the current level second basic unit is connected to the first terminal of the next level first basic unit, and a third terminal of the current level second basic unit is connected to the first terminal of the next level second basic unit.

8. The switched capacitor converter according to claim 7, wherein each first basic unit includes a first unit power transistor, a second unit power transistor, a third unit power transistor and a first unit capacitor, a first terminal of the first unit capacitor and a first terminal of the third unit power transistor are connected as a first terminal of the each first basic unit, a second terminal of the third unit power transistor is a second terminal of the each first basic unit, a second terminal of the first unit capacitor is connected to a first terminal of the first unit power transistor and a second terminal of the second unit power transistor respectively, a first terminal of the second unit power transistor is a third terminal of the each first basic unit, and a second terminal of the first unit power transistor is grounded;

each second basic unit includes a fourth unit power transistor, a fifth unit power transistor, a sixth unit power transistor and a second unit capacitor, a first terminal of the second unit capacitor and a first terminal of the sixth unit power transistor are connected as a first terminal of the each second basic unit, a second terminal of the sixth unit power transistor is a second terminal of the each second basic unit, a second terminal of the second unit capacitor is connected to a first terminal of the fourth unit power transistor and a second terminal of the fifth unit power transistor respectively, a first terminal of the fifth unit power transistor is a third terminal of the each second basic unit, and a second terminal of the fourth unit power transistor is grounded; and both terminals of the auxiliary circuit are connected to a connection node which is connected to the first unit power transistor and the second unit power transistor of the level N−1-th first basic unit and a connection node which is connected to the fourth unit power transistor and the fifth unit power transistor of the level N−1-th second basic unit respectively.

9. A switched capacitor converter, comprising an auxiliary circuit, a first branch and a second branch, wherein the auxiliary circuit is connected between the first branch and the second branch, all power transistors of the first branch and the second branch are primary power transistors, and the auxiliary circuit is configured to transfer a charge or electric charges on one of the first branch and the second branch to another of the first branch and the second branch during a dead time when the primary power transistors are turned off, so that voltage difference of both terminals of each of the primary power transistors becomes zero, and the primary power transistors are turned on under zero voltage respectively;

wherein the auxiliary circuit comprises a fifteenth power transistor, a sixteenth power transistor, a seventeenth power transistor, an eighteenth power transistor and an inductor;

a first terminal of the fifteenth power transistor is connected to the first branch, a second terminal of the fifteenth power transistor is connected to a first terminal of the inductor and a first terminal of the sixteenth power transistor respectively, and a second terminal of the sixteenth power transistor is grounded; and a second terminal of the inductor is connected to a first terminal of the seventeenth power transistor and a first terminal of the eighteenth power transistor respectively, a second terminal of the seventeenth power transistor is grounded, and a second terminal of the eighteenth power transistor is connected to the second branch.

10. The switched capacitor converter according to claim 9, wherein the fifteenth power transistor, the sixteenth power transistor, the seventeenth power transistor and the eighteenth power transistor are N-type power transistors; or the sixteenth power transistor and the eighteenth power transistor are P-type power transistors, and the sixteenth power transistor and the seventeenth power transistor are N-type power transistors.

11. The switched capacitor converter according to claim 9, wherein the switched capacitor converter is a 4:1 switched capacitor converter, the first branch comprises a first power transistor, a second power transistor, a third power transistor, a fourth power transistor, a fifth power transistor, a sixth power transistor, a seventh power transistor, a first capacitor and a second capacitor, and the second branch includes an eighth power transistor, a ninth power transistor, a tenth power transistor, an eleventh power transistor, a twelfth power transistor, a thirteenth power transistor, a fourteenth power transistor, a third capacitor and a fourth capacitor;

a first terminal of the seventh power transistor and a first terminal of the fourteenth power transistor are connected as an input terminal of the switched capacitor converter, the input terminal is connected to an external input voltage, a second terminal of the seventh power transistor is connected to a first terminal of the sixth power transistor and a first terminal of the second capacitor respectively, and a second terminal of the fourteenth power transistor is connected to a first terminal of the thirteenth power transistor and a first terminal of the fourth capacitor respectively;

a second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively;

a second terminal of the fifth power transistor is connected to a first terminal of the fourth power transistor and a second terminal of the second capacitor, a second terminal of the twelfth power transistor is connected to a first terminal of the eleventh power transistor and a second terminal of the fourth capacitor respectively, and a second terminal of the fourth power transistor and a second terminal of the eleventh power transistor are grounded;

a second terminal of the third power transistor is connected to a first terminal of the second power transistor, a second terminal of the second power transistor is connected to a first terminal of the first power transistor and a second terminal of the first capacitor respectively, and a second terminal of the first power transistor is grounded;

a second terminal of the tenth power transistor is connected to a first terminal of the ninth power transistor, a second terminal of the ninth power transistor is connected to a first terminal of the eighth power transistor and a second terminal of the third capacitor respectively, and a second terminal of the eighth power transistor is grounded;

the second terminal of the third power transistor, the first terminal of the second power transistor, the first terminal of the ninth power transistor and the second terminal of the tenth power transistor are connected as an output terminal of the switched capacitor converter;

the second terminal of the second capacitor, the second terminal of the fifth power transistor and the first terminal of the fourth power transistor are connected as a second node, and the second terminal of the fourth capacitor, the second terminal of the twelfth power transistor and the first terminal of the eleventh power transistor are connected as a fourth node; and both terminals of the auxiliary circuit are connected to the second node and the fourth node respectively.

12. The switched capacitor converter according to claim 9, wherein the switched capacitor converter is a 8:1 switched capacitor converter, the first branch comprises a first power transistor, a second power transistor, a third power transistor, a fourth power transistor, a fifth power transistor, a sixth power transistor, a seventh power transistor, a first sub power transistor, a third sub power transistor, a fifth sub power transistor, a first capacitor, a second capacitor and a first sub capacitor;

the second branch includes an eighth power transistor, a ninth power transistor, a tenth power transistor, an eleventh power transistor, a twelfth power transistor, a thirteenth power transistor, a fourteenth power transistor, a second sub power transistor, a fourth sub power transistor, a sixth sub power transistor, a third capacitor, a fourth capacitor and a second sub capacitor;

a first terminal of the fifth sub power transistor and a first terminal of the sixth sub power transistor are connected as an input terminal of the switched capacitor converter, the input terminal of the switched capacitor converter is connected to an external input voltage, a second terminal of the fifth sub power transistor is connected to a first terminal of the first sub capacitor and a first terminal of the third sub power transistor respectively, and a second terminal of the sixth sub power transistor is connected to a first terminal of the second sub capacitor and a first terminal of the fourth sub power transistor respectively;

a second terminal of the third sub power transistor is connected to a first terminal of the thirteenth power transistor, a first terminal of the fourth capacitor and a first terminal of the second sub power transistor respectively, and a second terminal of the fourth sub power transistor is connected to a first terminal of the sixth power transistor, a first terminal of the second capacitor and a first terminal of the first sub power transistor respectively;

a second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively;

a second terminal of the third power transistor is connected to a first terminal of the second power transistor, a second terminal of the second power transistor is connected to a second terminal of the first capacitor and a first terminal of the first power transistor respectively, and a second terminal of the first power transistor is grounded;

a second terminal of the fifth power transistor is connected to a second terminal of the second capacitor and a first terminal of the fourth power transistor respectively, and a second terminal of the fourth power transistor is grounded;

a second terminal of the first sub power transistor is connected to a second terminal of the first sub capacitor and a first terminal of the seventh power transistor, and a second terminal of the seventh power transistor is grounded;

a second terminal of the tenth power transistor is connected to a first terminal of the ninth power transistor, a second terminal of the ninth power transistor is connected to a second terminal of the third capacitor and a first terminal of the eighth power transistor respectively, and a second terminal of the eighth power transistor is grounded;

a second terminal of the twelfth power transistor is connected a second terminal of the fourth capacitor and a first terminal of the eleventh power transistor, and a second terminal of the eleventh power transistor is grounded;

a second terminal of the second sub power transistor is connected to a second terminal of the second sub capacitor and a first terminal of the fourteenth power transistor, and a second terminal of the fourteenth power transistor is grounded;

the second terminal of the third power transistor, the first terminal of the second power transistor, the second terminal of the tenth power transistor and the second terminal of the ninth power transistor are connected to the output terminal of the switched capacitor converter;

the second terminal of the first sub capacitor, the second terminal of the first sub power transistor and the first terminal of the seventh power transistor are connected as a first sub node, and the second terminal of the second sub capacitor, the second terminal of the second sub power transistor and the first terminal of the fourteenth power transistor are connected as a second sub node; and both terminals of the auxiliary circuit are connected to the first sub node and the second sub node respectively.

13. The switched capacitor converter according to claim 9, wherein N is an integer greater than or equal to 4, the switched capacitor converter is a 2N:1 switched capacitor converter, the first branch includes a first power transistor, a second power transistor, a third power transistor, a first capacitor, N−1 first basic units and a first inputting power transistor, and the second branch includes an eighth power transistor, a ninth power transistor, a tenth power transistor, a third capacitor, N−1 second basic units and a second inputting power transistor;

a first terminal of the first power transistor is connected to a second terminal of the second power transistor and a second terminal of the first capacitor respectively, a second terminal of the first power transistor is grounded, a first terminal of the first capacitor and a first terminal of the third power transistor are connected to a first connection node, and a first terminal of the second power transistor and a second terminal of the third power transistor are connected to an output terminal of the switched capacitor converter;

a first terminal of the eighth power transistor is connected to a second terminal of the ninth power transistor and a second terminal of the third capacitor respectively, a second terminal of the eighth power transistor is grounded, a first terminal of the third capacitor and a first terminal of the tenth power transistor are connected to a second connection node, and a first terminal of the ninth power transistor and a second terminal of the tenth power transistor are connected to the output terminal of the switched capacitor converter;

a first terminal of the first inputting power transistor and a first terminal of the second inputting power transistor are connected to an input terminal of the switched capacitor converter, a second terminal of the first inputting power transistor is connected to the first connection node and the second connection node respectively through the N−1 first basic units in turn according to a sequence from a level N−1-th first basic unit to a level 1-th first basic unit, and a second terminal of the second inputting power transistor is connected to the first connection node and the second connection node respectively through the N−1 second basic units in turn according to a sequence from a level N−1-th second basic unit to a level 1-th second basic unit; and the second terminal of the first inputting power transistor is connected to the level N−1-th first basic unit, and the level 1-th first basic unit is connected to the first connection node and the second connection node respectively; and the second terminal of the second inputting power transistor is connected to the level N−1-th second basic unit, and the level 1-th second basic unit is connected to the first connection node and the second connection node respectively.

14. A switched capacitor converter, comprising an auxiliary circuit, a first branch and a second branch, wherein the auxiliary circuit is connected between the first branch and the second branch, all power transistors of the first branch and the second branch are primary power transistors, and the auxiliary circuit is configured to transfer a charge or electric charges on one of the first branch and the second branch to another of the first branch and the second branch during a dead time when the primary power transistors are turned off, so that voltage difference of both terminals of each of the primary power transistors becomes zero, and the primary power transistors are turned on under zero voltage respectively;

wherein the auxiliary circuit comprises a fifteenth power transistor, a sixteenth power transistor, a first diode, a second diode and an inductor;

a first terminal of the fifteenth power transistor is connected to the first branch, a second terminal of the fifteenth power transistor is connected to a first terminal of the first diode and a first terminal of the inductor, a second terminal of the first diode is grounded; and a second terminal of the inductor is connected to a first terminal of the second diode and a first terminal of the sixteenth power transistor, a second terminal of the second diode is grounded, and a second terminal of the sixteenth power transistor is connected to the second branch.

15. The switched capacitor converter according to claim 14, wherein the fifteenth power transistor and the sixteenth power transistor are N-type power transistors or P-type power transistors.

16. The switched capacitor converter according to claim 14, wherein the switched capacitor converter is a 4:1 switched capacitor converter, the first branch comprises a first power transistor, a second power transistor, a third power transistor, a fourth power transistor, a fifth power transistor, a sixth power transistor, a seventh power transistor, a first capacitor and a second capacitor, and the second branch includes an eighth power transistor, a ninth power transistor, a tenth power transistor, an eleventh power transistor, a twelfth power transistor, a thirteenth power transistor, a fourteenth power transistor, a third capacitor and a fourth capacitor;

a first terminal of the seventh power transistor and a first terminal of the fourteenth power transistor are connected as an input terminal of the switched capacitor converter, the input terminal is connected to an external input voltage, a second terminal of the seventh power transistor is connected to a first terminal of the sixth power transistor and a first terminal of the second capacitor respectively, and a second terminal of the fourteenth power transistor is connected to a first terminal of the thirteenth power transistor and a first terminal of the fourth capacitor respectively;

a second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively;

a second terminal of the fifth power transistor is connected to a first terminal of the fourth power transistor and a second terminal of the second capacitor, a second terminal of the twelfth power transistor is connected to a first terminal of the eleventh power transistor and a second terminal of the fourth capacitor respectively, and a second terminal of the fourth power transistor and a second terminal of the eleventh power transistor are grounded;

a second terminal of the third power transistor is connected to a first terminal of the second power transistor, a second terminal of the second power transistor is connected to a first terminal of the first power transistor and a second terminal of the first capacitor respectively, and a second terminal of the first power transistor is grounded;

a second terminal of the tenth power transistor is connected to a first terminal of the ninth power transistor, a second terminal of the ninth power transistor is connected to a first terminal of the eighth power transistor and a second terminal of the third capacitor respectively, and a second terminal of the eighth power transistor is grounded;

the second terminal of the third power transistor, the first terminal of the second power transistor, the first terminal of the ninth power transistor and the second terminal of the tenth power transistor are connected as an output terminal of the switched capacitor converter;

the second terminal of the second capacitor, the second terminal of the fifth power transistor and the first terminal of the fourth power transistor are connected as a second node, and the second terminal of the fourth capacitor, the second terminal of the twelfth power transistor and the first terminal of the eleventh power transistor are connected as a fourth node; and both terminals of the auxiliary circuit are connected to the second node and the fourth node respectively.

17. The switched capacitor converter according to claim 14, wherein the switched capacitor converter is a 8:1 switched capacitor converter, the first branch comprises a first power transistor, a second power transistor, a third power transistor, a fourth power transistor, a fifth power transistor, a sixth power transistor, a seventh power transistor, a first sub power transistor, a third sub power transistor, a fifth sub power transistor, a first capacitor, a second capacitor and a first sub capacitor;

the second branch includes an eighth power transistor, a ninth power transistor, a tenth power transistor, an eleventh power transistor, a twelfth power transistor, a thirteenth power transistor, a fourteenth power transistor, a second sub power transistor, a fourth sub power transistor, a sixth sub power transistor, a third capacitor, a fourth capacitor and a second sub capacitor;

a first terminal of the fifth sub power transistor and a first terminal of the sixth sub power transistor are connected as an input terminal of the switched capacitor converter, the input terminal of the switched capacitor converter is connected to an external input voltage, a second terminal of the fifth sub power transistor is connected to a first terminal of the first sub capacitor and a first terminal of the third sub power transistor respectively, and a second terminal of the sixth sub power transistor is connected to a first terminal of the second sub capacitor and a first terminal of the fourth sub power transistor respectively;

a second terminal of the third sub power transistor is connected to a first terminal of the thirteenth power transistor, a first terminal of the fourth capacitor and a first terminal of the second sub power transistor respectively, and a second terminal of the fourth sub power transistor is connected to a first terminal of the sixth power transistor, a first terminal of the second capacitor and a first terminal of the first sub power transistor respectively;

a second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively;

a second terminal of the third power transistor is connected to a first terminal of the second power transistor, a second terminal of the second power transistor is connected to a second terminal of the first capacitor and a first terminal of the first power transistor respectively, and a second terminal of the first power transistor is grounded;

a second terminal of the fifth power transistor is connected to a second terminal of the second capacitor and a first terminal of the fourth power transistor respectively, and a second terminal of the fourth power transistor is grounded;

a second terminal of the first sub power transistor is connected to a second terminal of the first sub capacitor and a first terminal of the seventh power transistor, and a second terminal of the seventh power transistor is grounded;

a second terminal of the tenth power transistor is connected to a first terminal of the ninth power transistor, a second terminal of the ninth power transistor is connected to a second terminal of the third capacitor and a first terminal of the eighth power transistor respectively, and a second terminal of the eighth power transistor is grounded;

a second terminal of the twelfth power transistor is connected a second terminal of the fourth capacitor and a first terminal of the eleventh power transistor, and a second terminal of the eleventh power transistor is grounded;

a second terminal of the second sub power transistor is connected to a second terminal of the second sub capacitor and a first terminal of the fourteenth power transistor, and a second terminal of the fourteenth power transistor is grounded;

the second terminal of the third power transistor, the first terminal of the second power transistor, the second terminal of the tenth power transistor and the second terminal of the ninth power transistor are connected to the output terminal of the switched capacitor converter;

the second terminal of the first sub capacitor, the second terminal of the first sub power transistor and the first terminal of the seventh power transistor are connected as a first sub node, and the second terminal of the second sub capacitor, the second terminal of the second sub power transistor and the first terminal of the fourteenth power transistor are connected as a second sub node; and both terminals of the auxiliary circuit are connected to the first sub node and the second sub node respectively.

18. The switched capacitor converter according to claim 14, wherein N is an integer greater than or equal to 4, the switched capacitor converter is a 2N:1 switched capacitor converter, the first branch includes a first power transistor, a second power transistor, a third power transistor, a first capacitor, N−1 first basic units and a first inputting power transistor, and the second branch includes an eighth power transistor, a ninth power transistor, a tenth power transistor, a third capacitor, N−1 second basic units and a second inputting power transistor;

a first terminal of the first power transistor is connected to a second terminal of the second power transistor and a second terminal of the first capacitor respectively, a second terminal of the first power transistor is grounded, a first terminal of the first capacitor and a first terminal of the third power transistor are connected to a first connection node, and a first terminal of the second power transistor and a second terminal of the third power transistor are connected to an output terminal of the switched capacitor converter;

a first terminal of the eighth power transistor is connected to a second terminal of the ninth power transistor and a second terminal of the third capacitor respectively, a second terminal of the eighth power transistor is grounded, a first terminal of the third capacitor and a first terminal of the tenth power transistor are connected to a second connection node, and a first terminal of the ninth power transistor and a second terminal of the tenth power transistor are connected to the output terminal of the switched capacitor converter;

a first terminal of the first inputting power transistor and a first terminal of the second inputting power transistor are connected to an input terminal of the switched capacitor converter, a second terminal of the first inputting power transistor is connected to the first connection node and the second connection node respectively through the N−1 first basic units in turn according to a sequence from a level N−1-th first basic unit to a level 1-th first basic unit, and a second terminal of the second inputting power transistor is connected to the first connection node and the second connection node respectively through the N−1 second basic units in turn according to a sequence from a level N−1-th second basic unit to a level 1-th second basic unit; and the second terminal of the first inputting power transistor is connected to the level N−1-th first basic unit, and the level 1-th first basic unit is connected to the first connection node and the second connection node respectively; and the second terminal of the second inputting power transistor is connected to the level N−1-th second basic unit, and the level 1-th second basic unit is connected to the first connection node and the second connection node respectively.

19. A switched capacitor converter, comprising an auxiliary circuit, a first branch and a second branch, wherein the auxiliary circuit is connected between the first branch and the second branch, all power transistors of the first branch and the second branch are primary power transistors, and the auxiliary circuit is configured to transfer a charge or electric charges on one of the first branch and the second branch to another of the first branch and the second branch during a dead time when the primary power transistors are turned off, so that voltage difference of both terminals of each of the primary power transistors becomes zero, and the primary power transistors are turned on under zero voltage respectively;

wherein the auxiliary circuit includes a fifteenth power transistor, a sixteenth power transistor and an inductor, a first terminal of the fifteenth power transistor is connected to the first branch, a second terminal of the fifteenth power transistor is connected to a first terminal of the inductor, a second terminal of the inductor is connected to a first terminal of the sixteenth power transistor, and a second terminal of the sixteenth power transistor is connected to the second branch.

20. The switched capacitor converter according to claim 19, wherein the fifteenth power transistor and the sixteenth power transistor are N-type power transistors or P-type power transistors.

21. The switched capacitor converter according to claim 19, wherein the switched capacitor converter is a 4:1 switched capacitor converter, the first branch comprises a first power transistor, a second power transistor, a third power transistor, a fourth power transistor, a fifth power transistor, a sixth power transistor, a seventh power transistor, a first capacitor and a second capacitor, and the second branch includes an eighth power transistor, a ninth power transistor, a tenth power transistor, an eleventh power transistor, a twelfth power transistor, a thirteenth power transistor, a fourteenth power transistor, a third capacitor and a fourth capacitor;

a first terminal of the seventh power transistor and a first terminal of the fourteenth power transistor are connected as an input terminal of the switched capacitor converter, the input terminal is connected to an external input voltage, a second terminal of the seventh power transistor is connected to a first terminal of the sixth power transistor and a first terminal of the second capacitor respectively, and a second terminal of the fourteenth power transistor is connected to a first terminal of the thirteenth power transistor and a first terminal of the fourth capacitor respectively;

a second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively;

a second terminal of the fifth power transistor is connected to a first terminal of the fourth power transistor and a second terminal of the second capacitor, a second terminal of the twelfth power transistor is connected to a first terminal of the eleventh power transistor and a second terminal of the fourth capacitor respectively, and a second terminal of the fourth power transistor and a second terminal of the eleventh power transistor are grounded;

a second terminal of the third power transistor is connected to a first terminal of the second power transistor, a second terminal of the second power transistor is connected to a first terminal of the first power transistor and a second terminal of the first capacitor respectively, and a second terminal of the first power transistor is grounded;

a second terminal of the tenth power transistor is connected to a first terminal of the ninth power transistor, a second terminal of the ninth power transistor is connected to a first terminal of the eighth power transistor and a second terminal of the third capacitor respectively, and a second terminal of the eighth power transistor is grounded;

the second terminal of the third power transistor, the first terminal of the second power transistor, the first terminal of the ninth power transistor and the second terminal of the tenth power transistor are connected as an output terminal of the switched capacitor converter;

the second terminal of the second capacitor, the second terminal of the fifth power transistor and the first terminal of the fourth power transistor are connected as a second node, and the second terminal of the fourth capacitor, the second terminal of the twelfth power transistor and the first terminal of the eleventh power transistor are connected as a fourth node; and both terminals of the auxiliary circuit are connected to the second node and the fourth node respectively.

22. The switched capacitor converter according to claim 19, wherein the switched capacitor converter is a 8:1 switched capacitor converter, the first branch comprises a first power transistor, a second power transistor, a third power transistor, a fourth power transistor, a fifth power transistor, a sixth power transistor, a seventh power transistor, a first sub power transistor, a third sub power transistor, a fifth sub power transistor, a first capacitor, a second capacitor and a first sub capacitor;
  the second branch includes an eighth power transistor, a ninth power transistor, a tenth power transistor, an eleventh power transistor, a twelfth power transistor, a thirteenth power transistor, a fourteenth power transistor, a second sub power transistor, a fourth sub power transistor, a sixth sub power transistor, a third capacitor, a fourth capacitor and a second sub capacitor;
  a first terminal of the fifth sub power transistor and a first terminal of the sixth sub power transistor are connected as an input terminal of the switched capacitor converter, the input terminal of the switched capacitor converter is connected to an external input voltage, a second terminal of the fifth sub power transistor is connected to a first terminal of the first sub capacitor and a first terminal of the third sub power transistor respectively, and a second terminal of the sixth sub power transistor is connected to a first terminal of the second sub capacitor and a first terminal of the fourth sub power transistor respectively;
  a second terminal of the third sub power transistor is connected to a first terminal of the thirteenth power transistor, a first terminal of the fourth capacitor and a first terminal of the second sub power transistor respectively, and a second terminal of the fourth sub power transistor is connected to a first terminal of the sixth power transistor, a first terminal of the second capacitor and a first terminal of the first sub power transistor respectively;
  a second terminal of the sixth power transistor is connected to a first terminal of the tenth power transistor, a first terminal of the third capacitor and a first terminal of the twelfth power transistor respectively, and a second terminal of the thirteenth power transistor is connected to a first terminal of the third power transistor, a first terminal of the first capacitor and a first terminal of the fifth power transistor respectively;
  a second terminal of the third power transistor is connected to a first terminal of the second power transistor, a second terminal of the second power transistor is connected to a second terminal of the first capacitor and a first terminal of the first power transistor respectively, and a second terminal of the first power transistor is grounded;
  a second terminal of the fifth power transistor is connected to a second terminal of the second capacitor and a first terminal of the fourth power transistor respectively, and a second terminal of the fourth power transistor is grounded;
  a second terminal of the first sub power transistor is connected to a second terminal of the first sub capacitor and a first terminal of the seventh power transistor, and a second terminal of the seventh power transistor is grounded;
  a second terminal of the tenth power transistor is connected to a first terminal of the ninth power transistor, a second terminal of the ninth power transistor is connected to a second terminal of the third capacitor and a first terminal of the eighth power transistor respectively, and a second terminal of the eighth power transistor is grounded;
  a second terminal of the twelfth power transistor is connected a second terminal of the fourth capacitor and a first terminal of the eleventh power transistor, and a second terminal of the eleventh power transistor is grounded;
  a second terminal of the second sub power transistor is connected to a second terminal of the second sub capacitor and a first terminal of the fourteenth power transistor, and a second terminal of the fourteenth power transistor is grounded;
  the second terminal of the third power transistor, the first terminal of the second power transistor, the second terminal of the tenth power transistor and the second terminal of the ninth power transistor are connected to the output terminal of the switched capacitor converter;
  the second terminal of the first sub capacitor, the second terminal of the first sub power transistor and the first terminal of the seventh power transistor are connected as a first sub node, and the second terminal of the second sub capacitor, the second terminal of the second sub power transistor and the first terminal of the fourteenth power transistor are connected as a second sub node; and
  both terminals of the auxiliary circuit are connected to the first sub node and the second sub node respectively.

23. The switched capacitor converter according to claim 19, wherein N is an integer greater than or equal to 4, the switched capacitor converter is a 2N:1 switched capacitor converter, the first branch includes a first power transistor, a second power transistor, a third power transistor, a first capacitor, N−1 first basic units and a first inputting power transistor, and the second branch includes an eighth power transistor, a ninth power transistor, a tenth power transistor, a third capacitor, N−1 second basic units and a second inputting power transistor;
  a first terminal of the first power transistor is connected to a second terminal of the second power transistor and a second terminal of the first capacitor respectively, a second terminal of the first power transistor is grounded, a first terminal of the first capacitor and a first terminal of the third power transistor are connected to a first connection node, and a first terminal of the second power transistor and a second terminal of the third power transistor are connected to an output terminal of the switched capacitor converter;
  a first terminal of the eighth power transistor is connected to a second terminal of the ninth power transistor and a second terminal of the third capacitor respectively, a second terminal of the eighth power transistor is grounded, a first terminal of the third capacitor and a first terminal of the tenth power transistor are connected to a second connection node, and a first terminal of the ninth power transistor and a second terminal of the tenth power transistor are connected to the output terminal of the switched capacitor converter;
  a first terminal of the first inputting power transistor and a first terminal of the second inputting power transistor are connected to an input terminal of the switched capacitor converter, a second terminal of the first inputting power transistor is connected to the first connection node and the second connection node respectively through the N−1 first basic units in turn according to a sequence from a level N−1-th first basic unit to a level 1-th first basic unit, and a second terminal of the second inputting power transistor is connected to the first connection node and the second connection node respectively through the N−1 second basic units in turn according to a sequence from a level N−1-th second basic unit to a level 1-th second basic unit; and the second terminal of the first inputting power transistor is connected to the level N−1-th first basic unit, and the level 1-th first basic unit is connected to the first connection node and the second connection node respectively; and the second terminal of the second inputting power transistor is connected to the level N−1-th second basic unit, and the level 1-th second basic unit is connected to the first connection node and the second connection node respectively.

\* \* \* \* \*